(12) United States Patent
Osechinskiy et al.

(10) Patent No.: US 11,940,461 B2
(45) Date of Patent: *Mar. 26, 2024

(54) NANOSCALE DYNAMIC MECHANICAL ANALYSIS VIA ATOMIC FORCE MICROSCOPY (AFM-NDMA)

(71) Applicant: BRUKER NANO, INC., Goleta, CA (US)

(72) Inventors: Sergey Osechinskiy, Goleta, CA (US); Anthonius Ruiter, Goleta, CA (US); Bede Pittenger, Goleta, CA (US); Syed-Asif Syed-Amanulla, Minneapolis, MN (US)

(73) Assignee: BRUKER NANO, INC., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,054

(22) Filed: Apr. 11, 2023

(65) Prior Publication Data
US 2023/0243867 A1  Aug. 3, 2023

Related U.S. Application Data

(63) Continuation of application No. 17/722,603, filed on Apr. 18, 2022, now Pat. No. 11,635,449, which is a continuation of application No. 17/234,185, filed on Apr. 19, 2021, now Pat. No. 11,307,220, which is a continuation of application No. 16/530,725, filed on Aug. 2, 2019, now Pat. No. 11,029,330.

(60) Provisional application No. 62/769,905, filed on Nov. 20, 2018, provisional application No. 62/715,166, filed on Aug. 6, 2018.

(51) Int. Cl.
| | |
|---|---|
| *G01Q 60/38* | (2010.01) |
| *G01Q 10/04* | (2010.01) |
| *G01Q 20/04* | (2010.01) |
| *G01Q 30/04* | (2010.01) |
| *B82Y 35/00* | (2011.01) |

(52) U.S. Cl.
CPC ............. *G01Q 60/38* (2013.01); *G01Q 10/04* (2013.01); *G01Q 20/04* (2013.01); *G01Q 30/04* (2013.01); *B82Y 35/00* (2013.01)

(58) Field of Classification Search
CPC ........ G01Q 10/04; G01Q 20/04; G01Q 30/04; B82Y 35/00
USPC .......................... 850/1, 2, 3, 5, 7, 33, 37, 40
See application file for complete search history.

(56) References Cited

U.S. PATENT DOCUMENTS

| | | | |
|---|---|---|---|
| 11,029,330 B2 * | 6/2021 | Osechinskiy | G01Q 20/04 |
| 11,307,220 B2 * | 4/2022 | Osechinskiy | G01N 3/42 |
| 11,635,449 B2 * | 4/2023 | Osechinskiy | G01Q 10/04 |
| | | | 850/1 |

* cited by examiner

*Primary Examiner* — Nicole M Ippolito
(74) *Attorney, Agent, or Firm* — Quarles & Brady LLP; Yakov S. Sidorin

(57) ABSTRACT

An atomic-force-microscope-based apparatus and method including hardware and software, configured to collect, in a dynamic fashion, and analyze data representing mechanical properties of soft materials on a nanoscale, to map viscoelastic properties of a soft-material sample. The use of the apparatus as an addition to the existing atomic-force microscope device.

20 Claims, 11 Drawing Sheets

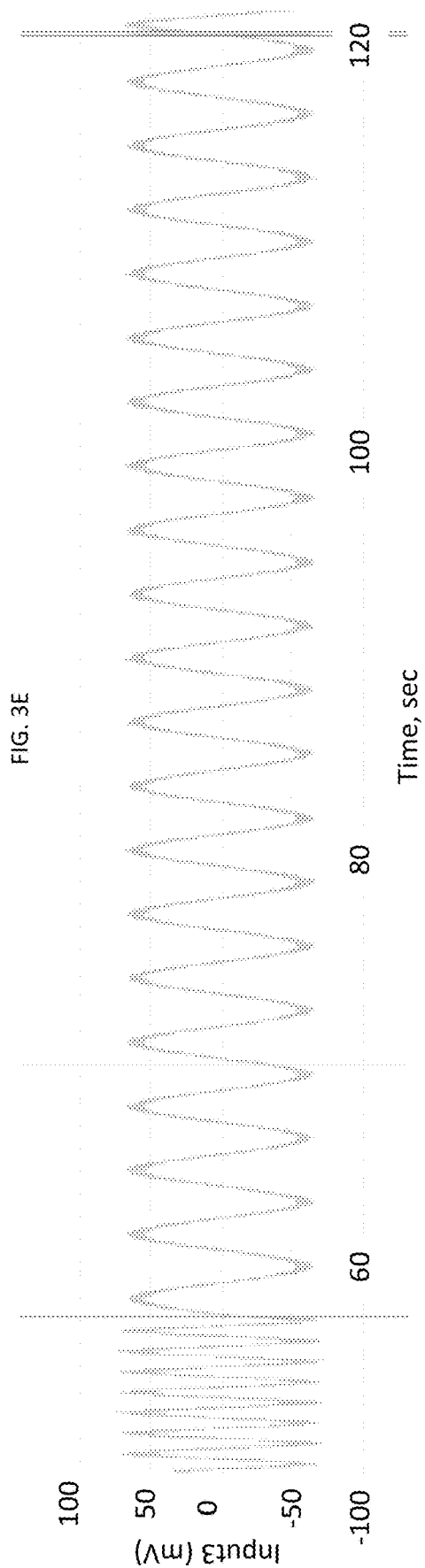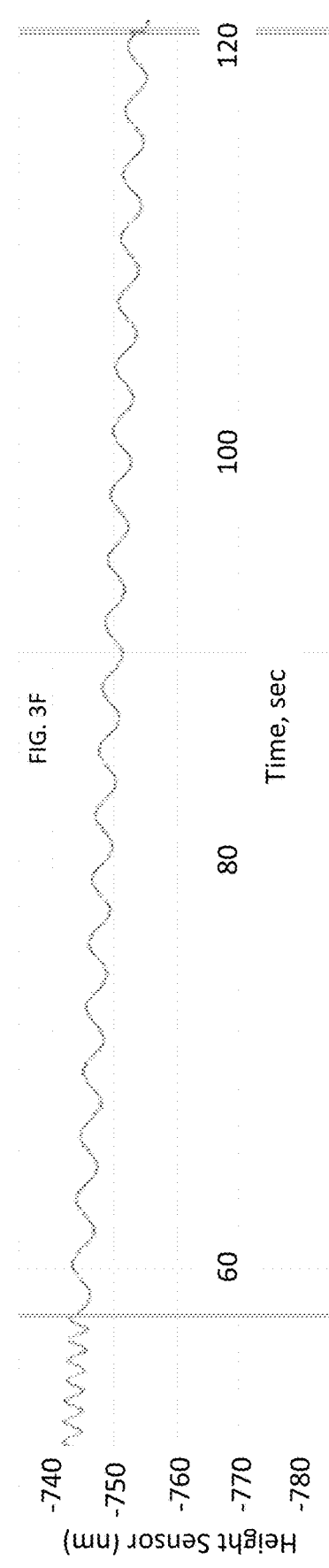

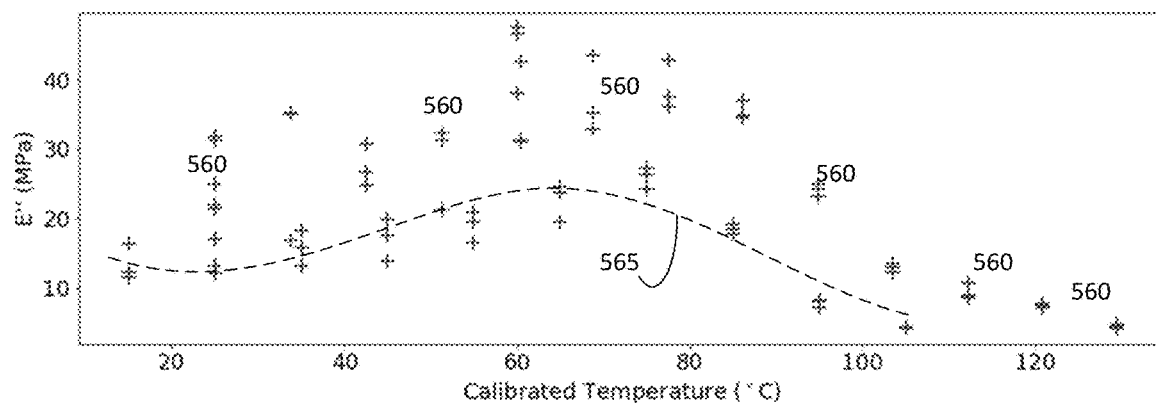
FIG. 5D Loss Modulus at 0.1 Hz (red: nDMA w/ Poisson 0.48; green: DMA)
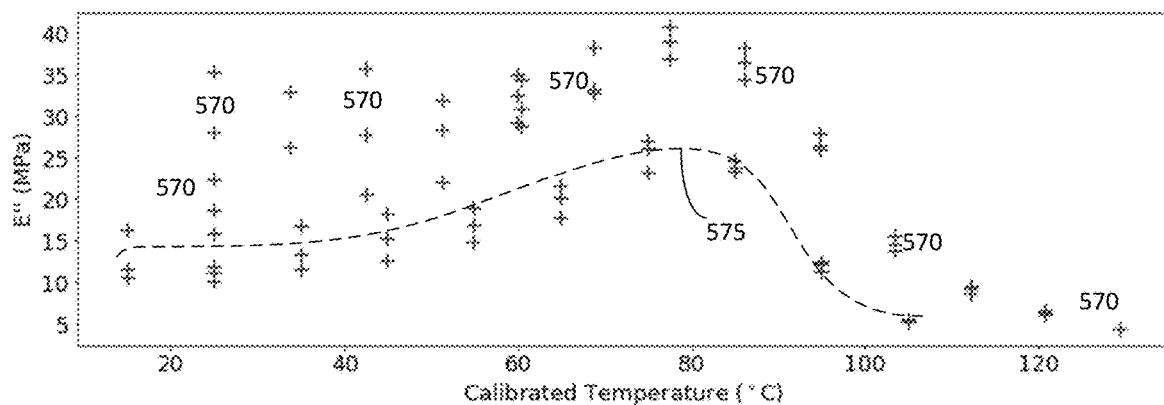
FIG. 5E Loss Modulus at 1.0 Hz (red: nDMA w/ Poisson 0.48; green: DMA)
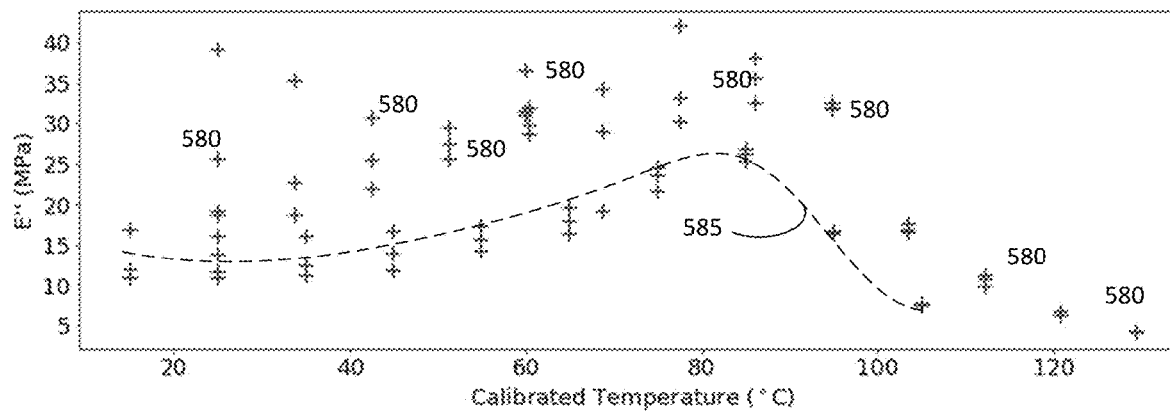
FIG. 5F Loss Modulus at 5.6 Hz (red: nDMA w/ Poisson 0.48; green: DMA)

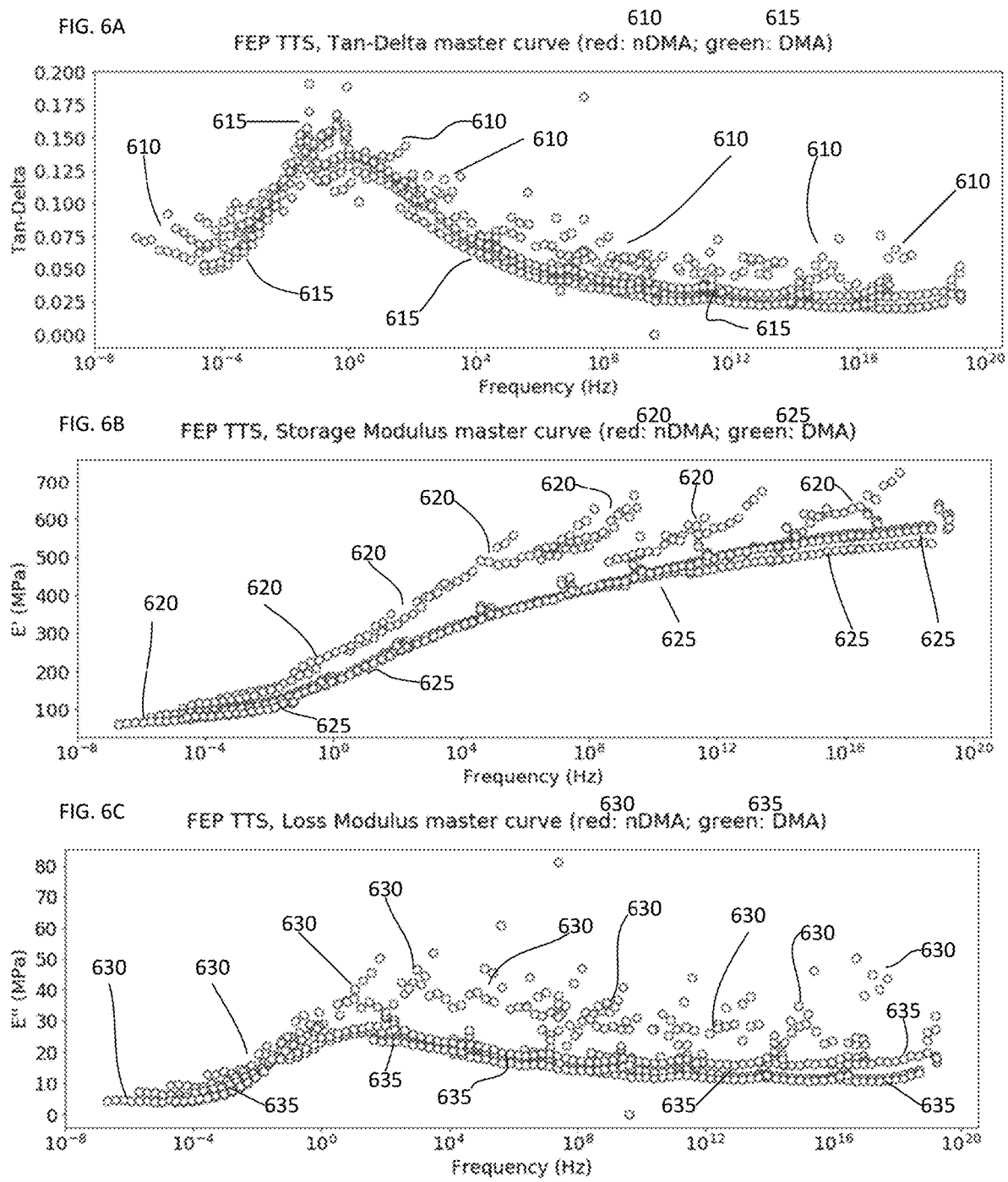

NANOSCALE DYNAMIC MECHANICAL ANALYSIS VIA ATOMIC FORCE MICROSCOPY (AFM-NDMA)

CROSS-REFERENCE TO RELATED APPLICATIONS

This patent application is a continuation from the U.S. patent application Ser. No. 17/722,603 filed on Apr. 18, 2022 and now published as US 2022/0252638, which is a continuation from the U.S. patent application Ser. No. 17/234,185 filed on Apr. 19, 2021 and now granted as U.S. Pat. No. 11,307,220, which is a continuation from the U.S. patent application Ser. No. 16/530,725 filed on Aug. 2, 2019 and now granted as U.S. Pat. No. 11,029,330, which in turn claims priority from and benefit of the U.S. Provisional Patent Applications No. 62/715,166 filed on Aug. 6, 2018, and No. 62/769,905 filed on Nov. 20, 2018. The disclosure of each of the above-identified patent applications is incorporated by reference herein.

TECHNICAL FIELD

The present invention relates generally to methodologies of determination of dynamic mechanical properties of materials and, more particularly, to nanoscale rheology of materials performed with the use of atomic force microscopy in specific range of frequencies—a low-frequency range that is practically relevant to rheology of soft materials.

RELATED ART

Dynamic Mechanical Analysis (DMA) is a measurement methodology designed to characterize viscoelastic mechanical properties of different materials (such as metals, composites, polymers, elastomers, etc).

Viscoelasticity is recognized to be the property of those materials that exhibit both viscous and elastic characteristics when undergoing deformation. Viscous materials under stress typically resist shear flow and strain linearly with time. Elastic materials strain when stretched and quickly return to their original state once the stress is removed. Considering viscoelasticity, the deformation (strain) exhibited by a solid material in response to a load force (stress) is typically time-dependent: such deformation (strain) depends not only on load (stress) magnitude, but on the rate of loading (~loading rate) and relaxation time as well.

According to the macroscopic (or bulk) DMA rheological characterization procedures, a periodic (harmonic) tensile, compressive, flexural or shear stress is typically applied to a material sample, causing excitation of the sample as a result of such load. The material's mechanical response (for example, amplitude and phase of such response) are then analyzed at the frequency of excitation (excitation frequency). The analysis is conventionally performed with the use of a lock-in amplifier. The DMA methodology has been established to measure material's storage modulus (E') and material loss modulus (E"), typically expressed in MPa or GPa, as well as the ratio E"/E' of these moduli (referred to as the "tan-delta", also known as a "loss-factor", "loss-tangent, or "damping"). These material properties are characterized as a function of frequency, temperature, time, stress or load, environmental conditions, or a combination of the above. (The alternative term—Dynamic Mechanical Thermal Analysis, DMTA—is sometimes used to emphasize the temperature dimension or dependency of the results of DMA measurements).

In considering the mechanical characteristics of soft materials, the low-frequency mechanical characteristics (that is, mechanical characteristics at frequencies up to several hundred Hz, for example up to 300 Hz) are recognized to be the most relevant to typical physiological motion of biomaterials and cells. The ability to determine the low-frequency mechanical characteristic of biomaterials and cells would significantly expand the current knowledge of soft materials. Moreover, the detailed understanding of low-frequency performance of various other materials is also desired—for example, polymer and rubber databases of the storage and loss moduli used in industry at the moment are well known to substantially lack microscopic and nanoscale data.

However, the existing DMA techniques (such as the use of nanoindentation of the materials, almost universally used in related art) are recognized to have limited spatial resolution when used on soft materials, which limits or even prevents such techniques from being used to study the mechanics of the soft materials on the length scale that AFM based instruments operates. For example, while some of currently existing DMA techniques—such as those employing nanoindenter systems that by definition are not employing any AFM-like instrumentation and is recognized as such in related art (see, for example, Pharr, G. M., Oliver, W. C. & Brotzen, F. R., *Journal of Materials Research* 7, 613-617, 1992; S. A. Syed Asif and J. P. Pethica, 505, 103, 1997 in *Symposium NN—Thin Films—Stresses & Mechanical Properties VII*; S. A. Syed Asif et al., *Journal of Applied Physics*, 90, 3, 2001; Herbert, E. G. et al, *Journal of Physics D—Applied Physics* 41, 2008) are arguably structured to theoretically allow for performance of such measurements, several factors have been pointed out to substantially preclude the existing DMA nanoindenter methodologies from making practical measurements at the length scale at which the AFM can perform the measurement on soft materials such as biomaterials or cells, for examples. Among these factors there are, non-linear elastic responses, and frequently considerable adhesion, to name just a few.

Current AFM-based viscoelastic measurement techniques are fundamentally restricted in that the use of these techniques does not allow for the material creep relaxation, which inevitably affects the quality and/or stability of contact attained between the tip of the probe and the sample during the measurement and, consequently, detrimentally affects the accuracy of the measurements. Because of such restriction(s), the system described in U.S. Pat. No. 9,417,170, for example, is configured to expressly avoid (keep away from and not to allow for) waiting, during the measurement, for relaxation of the contact of the indenter probe with the surface of interest, thereby making the described system and method substantially impractical both for quantitative measurements and mapping at rheologically-relevant (low range) frequencies.

A skilled artisan readily appreciates that there remains a strong demand for an AFM-based DMA technique devised to measure the dynamic moduli of soft materials at the nanoscale at low frequencies.

SUMMARY OF THE INVENTION

Embodiments of the invention are judiciously configured to perform AFM-based nanoscale measurements (that is, measurements on the geometrical scale of nanometers) of mechanical response of soft materials at low frequencies (as defined herein) with the use of atomic microscopy modalities judiciously configured to maintain at least one of the average sample-loading force and the average contact between the tip and the sample to be substantially constant. In one non-limiting embodiment, for example, the DC component of the sample-loading force is being maintained substantially constant, while the AC component of the sample-loading force is preferably maintained to be variable;

to perform dual-channel demodulation for up-to-date calibration of excitation of the sample;

in stark contradistinction with related art, to purposely consider and compensate for drift/creep of the sample caused by sample-preloading and/or to achieve relaxation of initial drift/creep of material caused by sample-preloading; and to correct contact radius (via contact stiffness at reference frequency, for example).

Embodiments of the invention provide an AFM-based system configured to determine a mechanical property of a surface of a viscoelastic sample. Such system includes a signal generator configured to generate a first oscillatory signal at at least one frequency, and a mechanical sub-system in operable cooperation with the signal generator. Here, the mechanical system is configured i) to reposition one of the sample and a cantilevered probe of an AFM of the system with respect to another until a point where a cantilever of the probe is deflected by a pre-determined amount from a nominal orientation of the cantilever; ii) to maintain the probe in a position, with respect to the surface of the sample, in which position at least one of 1) an average sample-loading force, generated by the probe, and 2) an area of contact between a tip of the probe and the surface is kept substantially constant; iii) to cause a mechanical oscillation of one of the sample and the probe with respect to another as a result of a transfer of the first oscillatory signal at the signal frequency to the mechanical system. The system further includes a position-detecting system configured to detect a deflection of the cantilever as a function of at least one of temporal and spatial factor characterizing an operation of the system.

The system additionally includes a programmable processor that is in electrical communication with the mechanical sub-system and that is programmed to transfer the first oscillatory signal from the signal generator to the mechanical sub-system, to suspend an operation of the mechanical sub-system for a period of time sufficient for relaxation of a creep of the surface (caused by repositioning of one of the sample and the cantilevered probe of the AFM with respect to another of the sample and the probe); and to acquire data, from the position-detecting system, to determine a viscoelastic parameter of the surface after a relaxation period of time lapsed. Here, the relaxation period of time is a period of time sufficient for relaxation of the creep (of the surface) that has been caused by repositioning of one of the sample and the cantilevered probe of the AFM with respect to another of the sample and the cantilevered probe. In one specific implementation, the system may additionally include electronic circuitry configured to measure, at a set of pre-defined frequencies, the viscoelastic parameter of the surface while compensating for the creep of the surface; and/or a recording device in operable communication with the processor and configured to produce an output that is perceivable by the user and that represents the viscoelastic parameter as a function of at least one of variable conditions of the process of measurement of the viscoelastic parameter. In any implementation, the signal generator may be intentionally configured to generate the first oscillatory signal at the only, the single frequency.

Embodiments additionally provide a method for determining a mechanical property of a soft viscoelastic sample with an atomic-force-microscope (AFM)-based system. The method includes the steps of: 1) repositioning a cantilevered probe of the system towards a surface of the sample until a cantilever of the probe is deflected by a pre-determined amount from a nominal orientation of the cantilever; and 2) modifying the process of repositioning to maintain at least one of i) an average sample-loading force, generated by the probe, and ii) an area of contact between a tip of the probe and the surface to be substantially constant. The method further includes the steps of measuring, at a set of pre-defined frequencies, a viscoelastic parameter of the surface while compensating or correcting for at least one of creep of the surface and a spatial drift of the system; and producing an output that is perceivable by a user and that is representing the viscoelastic parameter as a function of at least one of variable conditions of the process of measuring. In one implementation, the process of measuring the viscoelastic parameter may be carried out simultaneously at multiple frequencies from said set of pre-defined frequencies. In any implementation, the step of modifying the process of repositioning may include modulating a sample-loading force applied by the probe to the sample at a given excitation frequency from the set of pre-defined frequencies. (In the specific case of the latter, the modulating a sample-loading force may be performed by adjusting an amplitude and a phase of each oscillator component of the sample-loading force at each given excitation frequency from the set of pre-defined frequencies to a respectively-corresponding target value, while such adjusting is made dependent on response of a material of the sample applied modulated sample-loading force.) In substantially any implementation, the process of modifying the repositioning may include maintaining the average sample-loading force substantially constant while a separation between the surface and the base of the probe is being modulated. In substantially any embodiment, measuring the viscoelastic parameter may be carried out by performing dual-channel demodulation of operation of the system to effectuate at least one of: (a) simultaneously measuring both a force of excitation imposed on the sample by the probe and a deformation of the surface caused by the force of excitation, and (b) avoiding/preventing reiterative calibration of the system. (In a specific case, such performing dual-channel demodulation may include combining first and second data respectively received, during the step of measuring, from a first sensor of electronic circuitry of the system and a second sensor of the electronic circuitry of the system. Here, the first data represent a position of the probe with respect to the surface and the second data represent a degree of deflection of a cantilever of the probe from the nominal orientation.) In any embodiment, the method may additionally include pausing or suspending an operation of the system for a period of time sufficient for relaxation of a creep of the surface that has been caused by the process of repositioning. Substantially in any embodiment, the step of performing dual-channel demodulation may include introducing correction of at least one of drift-induced changes and creep-induced changes in signal data that have been received from at least one of first and second channels.

Substantially in any embodiment, the method may further include the step of continuously monitoring, with at least one of the first electronic circuitry and the second electronic circuitry of the system, an operation of the system at a reference frequency to compensate/correct for a change in the area of contact caused by the creep of the surface. (In the specific implementation of the latter, the continuously monitoring may be carried out by continuously monitoring using only one of the first electronic circuitry and the second electronic circuitry, and further include a step of acquiring calibration data representing signal from another of the first electronic circuitry and the second electronic circuitry obtained from a hard calibration sample.) Alternatively or in addition, the method may include the step of compensating for the change in the area of contact caused by the creep of the surface, wherein such compensating includes at least one of i) accounting for the change in the contact area while calculating the viscoelastic parameter with a programmable processor of the system, the programmable processor being operably connected with the AFM; and ii) repositioning the probe to compensate for such change. In any of the above cases, the choice of the reference frequency may include choosing the reference frequency that is not part of the set of pre-defined frequencies.

In any embodiment of the method, the step of measuring may be configured to include i) the process of acquisition (during a first period of time), from a sensor of electronic circuitry of the system, a first set of electrical signals at a frequency from the set of frequencies to determine a degree of indentation of the surface with the tip of the probe, and ii) the process of acquisition (during a second period of time), from the sensor of the electronic circuitry of the system, a second set of electrical signals at a reference frequency to compensate for a change in the area of contact caused by the creep of the surface. In such a case, the sensor includes at least one of a deflection sensor and a sensor configured to measure a position of the probe with respect to the surface. (In a specific implementation of the latter, the reference frequency may be chosen that is not included in the set of frequencies). The process of acquisition of the first set of electrical signals and the process of acquisition of the second set of electrical signals may be organized to have such acquisitions interleaved with one another. A method may additionally include a step of compensating for the change in the area of contact based on determining a change in dynamic stiffness of the contact between the probe and the sample.

BRIEF DESCRIPTION OF THE DRAWINGS

The invention will be more fully understood by referring to the following Detailed Description of Specific Embodiments in conjunction with the not-to scale Drawings, of which:

FIGS. 3A, 3B, 3C, 3D, 3E, and 3F provide examples of Signal Traces, Vertical Deflection and Z Sensor;

FIGS. 5A, 5B, 5C, 5D, 5E, 5F, illustrate results of measurements of the Storage and Loss Moduli of the Fluorinated Ethylene Propylene (FEP) material as a function of temperature (at three different fixed low frequencies: 0.1 Hz, 1.0 Hz, and 5.6 Hz). The comparison is provided between the results of the measurement of viscoelastic properties performed with an AFM-nDMA-based embodiment of the invention (on the geometrical scale of and below a micron) and those performed with a conventional (used by related art) bulk DMA methodology (on the scale of about a millimeter and larger);

FIG. 6A illustrates the experimentally-defined dependency of the ratio, of the storage modulus to the loss modulus for FEP, on frequency. Presented via the time-temperature superposition (TTS). The comparison is provided between the results of the measurement performed with an AFM-nDMA-based embodiment of the invention and those performed with a conventional bulk DMA methodology;

FIGS. 6B, 6C present, respectively, the dependencies of the Storage Modulus and the Loss Modulus on frequency (corresponding to the graph of FIG. 6A). Presented via the time-temperature superposition (TTS). The comparison is provided between the results of the measurement performed with an AFM-nDMA-based embodiment of the invention and those performed with a conventional bulk DMA methodology;

Figure 1:
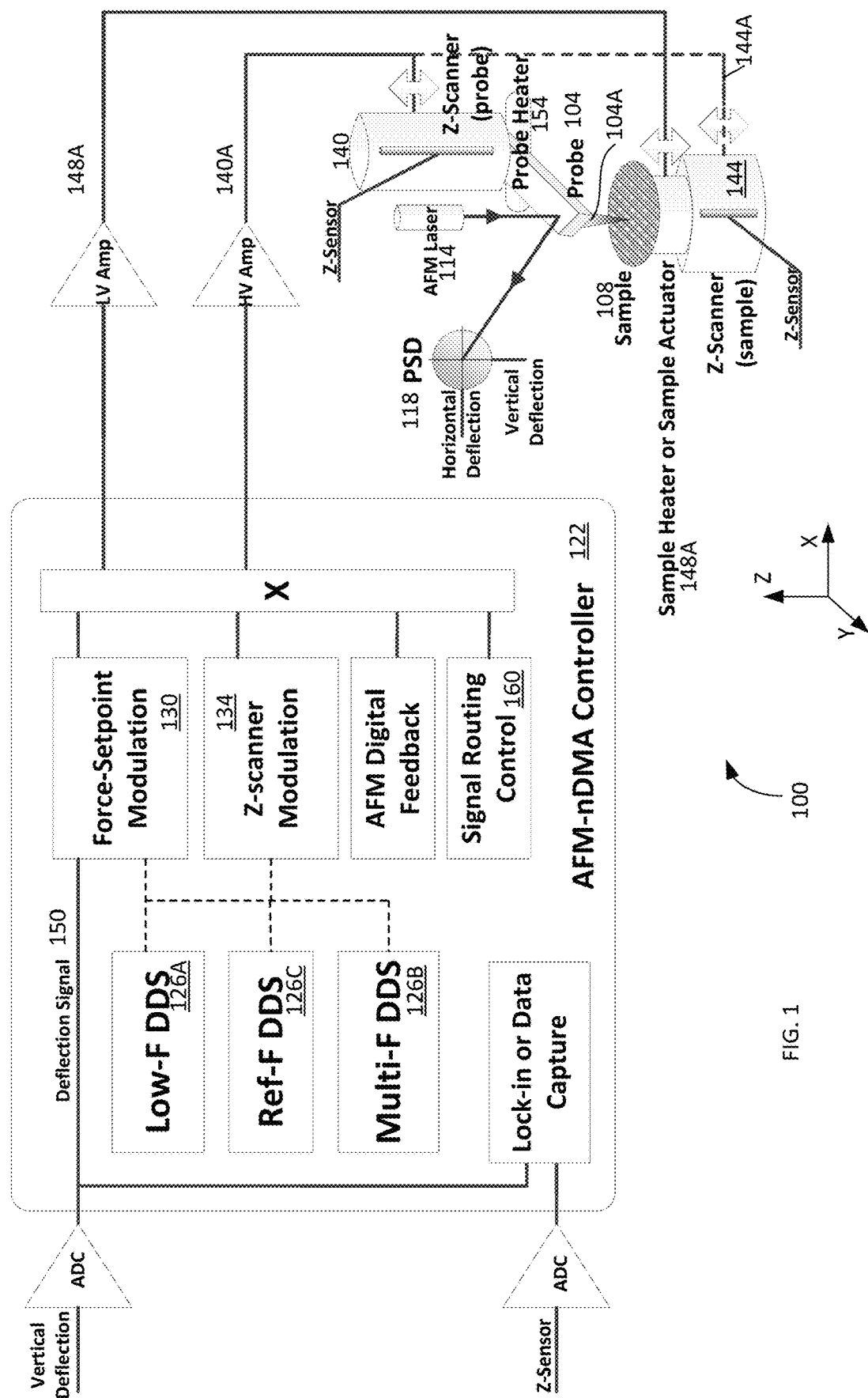
FIG. 1 provides a schematic diagram of an embodiment of the AFM-nDMA system of the invention the operation of which includes cooperation of the procedure of the Force Setpoint Modulation modality and the operation of the Z-scanner modulation electronic circuitry.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Embodiments of the system of the invention (including without limitation hardware, firmware, and software) are implemented on the basis of a state-of-the-art Atomic Force Microscope (AFM) instrument equipped with a digital controller and a programmable processor (a computer system). Nanoscale Dynamic Mechanical Analysis (NDMA) of a sample is performed with the aid of a cantilevered probe that interacts with and indents the sample surface with a controlled force, which force comprises both a quasi-static (DC) component and a dynamic (AC) oscillatory component.

The frequency (or multiple frequencies) of the oscillatory component of the force can be in the range that substantially matches the frequency range that is commonly of interest to the bulk, macroscopic DMA investigation of soft materials and various polymers—namely, within the limits of several decades of sub-Hz and low-Hz frequency range (e.g., from 0.01 Hz to about 200-300 Hz, as identified above). In the process of applying such controlled force (that includes both quasi-static and oscillatory interaction parts) force between a cantilevered probe and a sample under test (SUT), the normal-to-the-sample's-surface (vertical, for short of notation) motion of the base of the cantilevered probe is detected and measured in order to determine a mechanical response of the sample to both and each of the quasi-static force component (resulting in at least loading and unloading deformation) and the dynamic oscillatory force component (resulting in viscoelastic deformation under oscillatory load).

The term "soft materials", in the disclosure below, refers to materials the elastic modulus (Young modulus) of which does not exceed 10 GPa. (In contradistinction, a hard sample—used for calibration purposes, for example—can be defined as having the elastic modulus in the 100 GPa range. Approximate modulus values for some of hard materials include: for Sapphire—about 350 GPa; for Silicon—about 150 GPa; for Mica—greater or equal about 130 GPa; for Aluminum—greater or equal to about 70 GPa; for Copper—greater or equal to 110 GPa.) Alternatively or in addition, whether a given material is soft may be defined in comparison to the material of the AFM probe used in the measurements: an AFM probe is often made of silicon or silicon nitride, so a "soft material" with elastic modulus of less than about 10 GPa will be <10% of the elastic modulus of the tip material. A hard calibration sample, in this case, may be defined as having an elastic modulus the value of which is substantially equal to, or preferably about 50% or more greater than the elastic modulus of the material of the AFM tip being used during the operation of the system.

Embodiments of the system and method of the invention—generally referred to below as "AFM-nDMA"—utilize a cantilevered AFM-probe with well-defined specific geometrical configuration of the tip that applies a dynamic oscillatory load force to a material sample under test referred to as SUT (i.e. exposes such material sample to dynamic stress) in a low frequency range (defined, depending on implementation, as a sub-Hertz frequency range, or a frequency range of up to a few Hertz below 10 Hz, for example; or as a frequency range below about 300 Hz, in a specific implementation; see also below) that is of practical importance to rheology of soft materials, to enable the measurement of SUT's localized on the nanoscale dynamic response. Phrased differently, the use of an embodiment of the invention enables the measurement of a nanoscale dynamic complex-valued deformation of the SUT. For the purposes of the present disclosure and claims, the term "nanoscale" refers to and is used to represent dimensions of probe-sample contact(s) that are sub-micron.

The embodiments specifically make it possible to characterize the nanoscale dynamic response of the SUTs dimensioned as thin films of coatings, or composite materials. In contradistinction with related art, the measurement methodology is specifically devised to account for the relaxation of the material creep.

As a partial result of the so-configured measurement of the nanoscale dynamic response, a viscoelastic storage and loss moduli of the material SUT are determined in the low frequency range that are especially relevant to rheological analysis of soft materials in such a fashion as to allow direct comparison with material properties measured with the use of conventional DMA methods configured for macroscopic (bulk) analysis of material properties. The presented methodology generally facilitates and is particularly useful for the measurements in several frequency decades (in sub-Hertz, few Hertz, tens of Hertz, of about 100 Hertz, and few hundred Hertz such as up to 300 Hertz. For example, depending on the implementation, the embodiments of the invention provide operational advantages for measurements at frequencies from 0.001 Hz to 1000 Hz, preferably in a range from 0.01 Hz to 300 Hz, more preferably in the range from 0.1 Hz to 150 Hz, and most preferably in the range from 0.1 Hz to 100 Hz.

A person of skill in the art will readily recognize that, due to a measurement time (required to perform the associated with the low sub-Hertz frequency range determination) that is relatively long as compared with the time of measurement performed at higher frequencies, a long-term stability of the system and probe-sample contact remains important.

To satisfy the requirements of the long-term stability of the measurement system and to address problems caused by use of the conventional embodiments of DMA systems for measurements of viscoelasticity of soft samples at low frequencies, embodiments of the present invention are judiciously configured to employ atomic force microscopy and related techniques (in contradistinction with, for example, nanoindenter-like system known in the art to be different) and to carry out AFM-nDMA measurements specifically over long measurement times (from second to several minutes) at a set of pre-defined frequencies (which set is defined to include at least one and preferably multiple frequencies) due to the combination of the following technical features:

The use of Force Setpoint Modulation methodology, according to which the AFM-nDMA system of the invention is configured to maintain, in operation, at least one of (i) a specified level of pre-load force exerted onto the SUT and (ii) a probe-sample contact that is retained to have substantially constant dimension(s) (in one case—unchanging dimensions) regardless of and despite the presence of thermal drift and material creep—when such drift and/or creep occur during the measurement.

In one implementation, these operational characteristics are achieved by modulating the force applied by the probe to the sample (at a given excitation frequency) while, at the same time, maintaining the oscillation of the probe caused by the AC component of the force to enable dynamic measurement, and while maintaining the DC component of such force at a substantially-constant level (via feedback by electronic circuitry with the use of the probe). This is effectuated in contradistinction with related AFM-based art, which employs the modulation of displacement between the probe of the AFM and the sample under test.

The use of an AFM-based dual-channel demodulation scheme configured, as a measurement sub-system, to combine data/information acquired from two measurement channels of the data-acquisition electronic circuitry (referred to, for short, as a Z-sensor and a Deflection sensor), to allow for simultaneous and instantaneous measurements of both the excitation force and the resulting deformation of the SUT. This is done contrary to the well-established utilization of the only, single measurement channel in the art. (As will be readily recognized by a skilled artisan, the single, only measurement channel of the prior art is configured such that the continued use of the system requires reiterative calibration of the system).

The Z-channel of an embodiment of the invention is configured to measure the separation between the base of the probe and the SUT, to extract the information about both the amplitude and the phase of the signal representing the interaction between the tip and the SUT. (The base of the probe corresponds to an end of the probe that is opposite to the end carrying or containing a tip; it is the base of the probe that is typically affixed in the AFM probe holder contraption.) The use of a dual-channel scheme, therefore, enables an embodiment to not rely on (and, in operation, to be free from) keeping the calibration of amplitude and phase of the excitation force up-to-date during a potentially long measurement time.

A typical Deflection Sensor is realized with the use of a laser source configured to deliver a beam of light and focusing this beam of light on the upper surface of the probe lever, and then the reflecting the beam towards a four-quadrant photodetector. A change in deflection of probe's cantilever results is translated into the angular change of the reflected laser beam and change in position of the reflected beam on the photodetector. The judiciously-defined, as known in the art, difference electronic signal from four-quadrant photodetector circuitry is amplified and serves as a signal representing the vertical deflection of the probe. With appropriate calibration, the deflection signal can be used to detect a nanometer-scale deflection or a force exerted by the probe on the nano-Newton scale.

Accordingly, an embodiment of the invention includes a method in which performing dual-channel demodulation includes combining first and second data respectively received, during the measuring, from a first sensor of electronic circuitry of the system and a second sensor of the electronic circuitry of the system. Here, the first data represent a position of the probe with respect to the surface and the second data represent a degree of deflection of a cantilever of the probe from the nominal (un-deflected, un-influenced) orientation. (It is understood that more generally, if, for example, the Z-sensor channel is not used or is not available—such as in the case of the sample actuator excitation—one makes up for a missing channel by using the calibration with the first channel on a hard-surface calibration sample. Such calibration can be provided by measuring the deflection on the sample of sapphire and using the results as Z amplitude and phase on the target sample later, if Z sensor proves to be unavailable).

The use of "software lock-in" methodology to implement demodulation of signals received from the dual-channel measurement sub-system. Here, a signal trace (buffered or recorded, for an online or off-line processing) is processed with an algorithm that combines the step of drift/creep correction and/or subtraction with "lock-in like" demodulation, of such signal, at a single or multiple frequencies in a lock-in like fashion, to compensate for changes in signal data received from at least one of the channels.

A hardware lock-in in known to perform a straightforward processing, which is not flexible. On the other hand, according to the idea of the invention, with the use of a digitized stored or buffered signal a more sophisticated algorithm can be run: in one example, a drift trend-line estimated with a moving average filter is subtracted from the stored or buffered signal, leaving just the oscillatory component for lock-in demodulation function. As a result, an error introduced into the lock-in amplitude (and/or, especially, phase) by drift/creep is dramatically reduced.

Such demodulation is implemented in contradistinction with the use, in related art, of hardware lock-in and/or Fourier-Transform-based (FFT/DFT) spectral analysis that do not allow for correction of drift or creep of the material (thereby causing inevitable errors in determination of each of amplitude and phase values for the excitation force, which errors are especially significant at a frequency scale that is substantially equal to the range of material drift frequency). While one embodiment of the invention operates at a single excitation frequency (according to one implementation of the Force Setpoint Modulation set-up), the proposed algorithm facilitates (enables, allows)—if required—the process of simultaneous demodulation of such a signal at multiple excitation frequencies, thereby providing parallel processing advantage and reducing the overall measurement time. For example, as was empirically verified, with simultaneous demodulation at two frequencies (0.1 Hz and 0.18 Hz, 20 cycles) the overall measurement time was reduced by about 36%; with simultaneous demodulation at five frequencies—by about 51%.

Optionally, an embodiment can additionally employ an electronic circuitry configured to continuously monitor an operation of the system at a reference frequency to correct for change in the contact area between the tip of the probe and the sample due to a material creep or adhesion creep. Here, to implement such monitoring, excitation of the probe at a pre-selected reference frequency is continuously mixed or interleaved or complemented with the excitation of the probe at other measurement (excitation) frequencies, so the dynamic stiffness of the probe-sample contact at the reference frequency could be continuously measured in parallel to and substantially during the other measurements performed at such other excitation frequencies.

From changes in dynamic stiffness (determined at the reference frequency), a relative change in the area/size of the contact is then deduced, and the corresponding correction is then applied to AFM-nDMA measurements at other excitation frequencies (including measurements at lower frequencies at which drift/creep of the material may be more pronounced in practice).

As an alternative AFM-based embodiment, "interleaved" (spaced in time) reference frequency measurement can be used instead of continuous monitoring at reference frequency (that is, reference frequency segments can be interleaved among other frequency measurements). As defined for the purposes of this disclose and the appended claims, when the first and second processes (for example, processes A and B) of measurements are interleaved with one another, these two processes are arranged to be performed in a general, not necessarily regularly alternating fashion, to form substantially any continuing sequence in which both A and B are present multiple times, such as ABABAB . . . , AABABBBA . . . , ABABBABABA . . . etc.

Notably, the described reference-frequency-monitoring-based correction typically may not be required (but is optionally possible) in conjunction with the implementation Force Setpoint modulation, where contact area can be maintained virtually unchanging (substantially constant) via force feedback. In some specific cases—for example, when material creep/flow of material is practically significant (for example, in case of measurement of polymers that lack cross-linked chains), the proposed reference frequency based correction may be gainfully implemented in addition to Force Setpoint Modulation.

It is recognized in the art, that initial creep of material occurs immediately after the pre-loading of the sample with the probe—for example, during the initial loading phase of the indentation cycle—because a viscoelastic material exhibits relaxation in response to a step-function-like load. Here, a note is due. A person of skill in the art cannot just choose to avoid drift altogether, but is in the position to choose a time scale on which drift is not operationally substantial. (And some of the AFM-related art investigations, in doing so, limited their technique to measurements at higher frequencies. In other words, low-frequency drift was shunned by performing the measurement at different—higher—frequencies.) A skilled artisan will readily appreciate that on the time-scale corresponding to the frequency range in which the implementation of the idea of the present invention provides operational advantages, material relaxation (creep) and drift cannot be avoided and have to be dealt with. (The embodiments that employ either the dual-channel demodulation approach and/or the reference frequency technique discussed below successfully address the separation of creep from drift in the low-frequency range.)

Accordingly, embodiments of the invention address the problems caused by the presence of initial creep and improve the accuracy of the overall measurement of material's viscoelastic properties at low frequencies by expressly including, as a step in operation of the AFM-nDMA system, a waiting period or time segment (for example, of about 10 second of duration, or about 20 seconds of duration, or about 30 seconds duration, depending on the particular implementation) that precedes the steps at which the AFM-nDMA performs the actions of excitation and measurement steps, to allow for relaxation of material under applied pre-load step. Embodiments of the present invention employ a flexible Ramp-Scripting methodology to seamlessly assign such initial relaxation "wait segment", which in practice can be followed by a step of nDMA measurement at the only, single frequency or at multiple mixed frequencies in parallel.

The present invention provides AFM-based nanoscale DMA (AFM-nDMA) method that is configured to extend the classical macroscopic bulk DMA approach to a spatial scale that is well below 1 micrometer. Note that nanoDMA™ is a trade mark for a viscoelastic-characteristic measurement technique on instrumented nanoindenter (not AFM-based) platform (Bruker-Hysitron). The general scope of this invention and of this disclosure is, therefore, a nano(-scale) DMA implemented specifically on the AFM platform, which will be further referred to as "AFM-nDMA" to avoid confusion with the above mentioned trade-marked "nanoDMA" technique name that is specific to a technique used with and implemented with the use of a nanoindenter instrumentation.

Examples of the AFM-nDMA Hardware and Measurement Methodologies

Embodiments of an AFM-nDMA System

Generally, the Nanoscale Dynamic Mechanical Analysis requires a resonance-free "flat drive" mechanical excitation, which can be challenging to achieve in the upper, kHz end of the frequency range. The embodiments of the present invention approach this challenge by using a specially designed sample actuator with high natural resonance frequency. In addition, the present invention employs a special sample mounting scheme that does not significantly affect resonant properties of the actuator, and also allows for calibration of actuator's amplitude and phase response by in-situ measurement with AFM system. Contrary to other designs utilizing a probe-holder actuator, this sample actuator does not excite or "back-drive" resonances of AFM scanner. Contrary to other designs based on electric- or magnetic-force or photo-thermal drive, the present invention can use conventional AFM probes and does not require AFM probes with specialized (drive) levers.

Implementation of an AFM-nDMA system includes an AFM instrument that has been judiciously modified/transformed/augmented to achieve the above-identified goals.

Generally, the AFM-nDMA apparatus (and the associated method of characterization of an SUT) are based on an AFM platform with a closed-loop scanner. The AFM scanner (interchangeably referred to as a scanner head or an AFM head) employs a piezo-based actuator (with three orthogonal axis of operation, x-axis, y-axis, and z-axis) appropriately programmed for positioning and scanning of an AFM probe with a probe tip relative to a sample and/or a sample-scanner or actuator configured to position and scan the sample with respect to the AFM probe. The probe can be positioned or scanned in a sample plane (for example, an xy-plane) while a separation distance (along the z-axis) between the probe and sample is maintained with a dedicated electronic circuitry. The scanner is configured to perform an indentation z-ramp with a hold period (hold time) on or at the sample surface ("Ramp & Hold"), where a predetermined level of load force (interchangeably referred to as trigger force, preload force, or indentation force) is reached by the time when the hold period starts. The tip-sample interaction force is determined by the (vertical) deflection of the AFM probe's lever, which is tracked by optical means and sensed on a four-quadrant photo-detector. Optionally, a detector channel that in operation registers the lateral (for example, horizontal) deflection of the probe lever is configured to provide information about the rolling or sliding of the probe tip. (Such detector channel may be referred to as a "friction" channel).

Structurally, the AFM probe includes a flexible lever member (or lever, for short) that is characterized by a spring constant or stiffness k (and measured, for example, in Newton per meter, N/m) with a nanoscale-size tip (having a tip radius, nominally dimensioned in [nm], the shape of which is typically approximated by a cone-and-sphere combination). The lever is attached to a substrate "chip" (of few mm in size) that can be spring-clipped or otherwise attached to a probe-holder of various types known in the art. A probe-holder, in turn, is dimensioned to be attached to the AFM head's XYZ scanner device (for example, via an attachment member including with several leaf-spring sockets and metal pins).

In one implementation, the AFM instrument is operably connected to a specialized (programmable) controller circuitry that preferably contains a digital signal processor (DSP) and a Field Programmable Gate Array (FPGA) configured to establish and maintain real-time control and digital feedback during the operation of the instrument; a computer processor runs application code and communicates with the AFM controller circuitry.

As is schematically illustrated in FIG. 1, for example, the embodiment 100 includes an atomic-force microscope (AFM, shown in a simplified version, as a combination of the probe 104 with a tip 104A that in operation is disposed above a surface of the SUT 108). An instantaneous position of the flexible probe 104 and/or its deviation from a reference position (as a result of interaction between the tip 104A and the SUT 108) is (a) assessed based on the deviation of a beam 110 from a laser source 114 (usually configured to generate visible light), in reflection of such beam from a surface of the probe 104, and (b) recorded after the so-reflected beam 110 has been received by a position-sensitive detector 118. (Other implementations of determination of the position of the probe can be implemented, as known in related art).

The AFM controller electronic circuitry system 122 is equipped with the specialized control module that allows a specific type(s) of excitation signal to be delivered to AFM feedback electronic circuitry 130 (configured to govern the operation of the system 100 in a Force Setpoint Modulation regime) and/or to a Z-scanner Modulation programmable electronic-circuitry module 134 (configured to change, during the operation of the system 100, a position and/or modulate the position of the probe 104 with the use of the Z-repositioner 140 and/or a position of the sample 108, with the use of the Z-repositioner 144, along a direction normal to the surface of the sample 108). Among the specific excitation signal(s) there are at least a low frequency excitation signal, a multi- (in one embodiment—dual) frequency excitation signal, and a mixed frequency sinusoidal excitation signal (produced, respectively, by electronic circuits of the electronic blocks 126A, 126B, and 126C). DDS: Direct Digital Synthesizer (a particular form of a digitally-implemented waveform generator, as known in related art. The process of changing a position and/or modulating the position of either the sample 108 or the probe 104 or both along the direction normal to the surface of the sample 108 (as show—z-axis) is generally referred herein as "Z-modulation". Examples of repositioners include electronically-controlled micro- and sub-micro-stepping positioning equipment known in related art.

Here,

In case of a low frequency excitation, provided by the Z-Scanner Module 134, the frequency of excitation of the movement of the probe and/or sample during the operation of the system 100 is from a sub-Hz frequency to several hundred Hz (specifically, from 0.001 Hz to 1,000 Hz; preferably from 0.01 Hz to 300 Hz, and even more preferably from 0.1 Hz to 150 Hz).

In case of a dual frequency excitation, the signal provided by the Z-scanner Module 134 to the at least one of the repositioners 140, 144 includes a mixed wave signal combining a low-frequency signal with a signal at a pre-determined reference frequency (which may be higher than the low frequency).

Figure 7A:
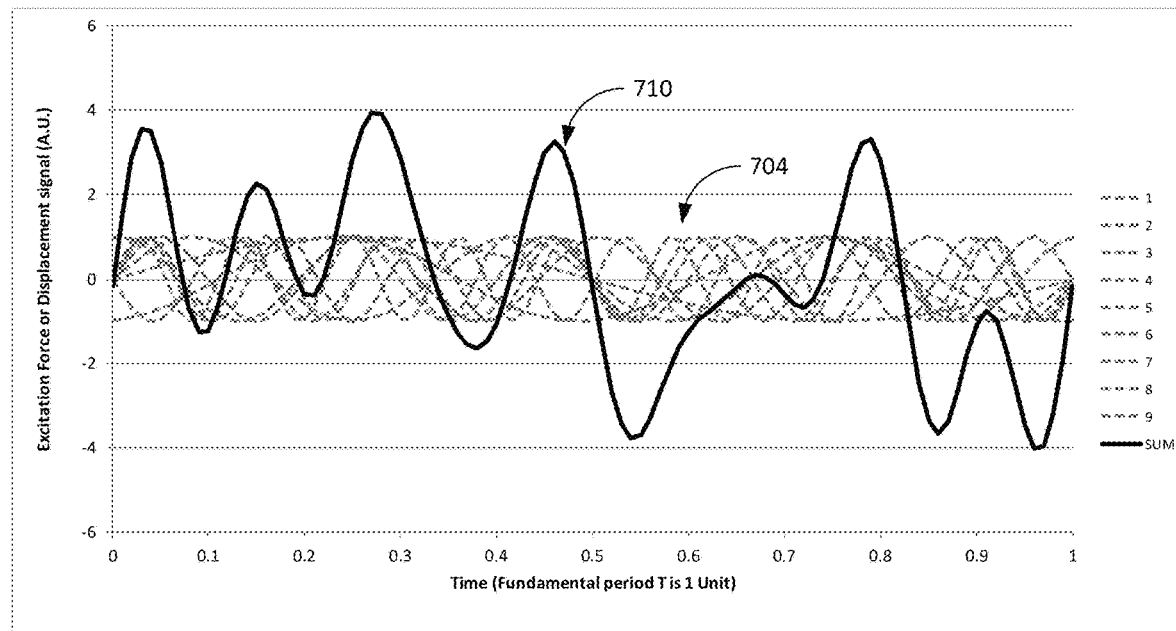
FIGS. 7A and 7B provide illustration to the modes of operation of the system in which the probe is driven with a signal the frequency spectrum of which combines several chosen frequencies.

In case of a mixed frequency excitation, the module 134 is configured to generate a driving signal that combines several (preferably ten or more) sinusoidal waves having respectively-corresponding distinct frequencies, amplitudes, and (optionally) phase relationships with one another. The chosen multiple frequencies of the individual sinusoidal wave components of the mixed frequency excitation aggregately can cover one or even several decades in frequency range. Information summarized in Table 1, 2 and FIGS. 7A, 7B provides illustrations to such mixed frequency excitation of the probe of the embodiment of the invention.

components is chosen to vary from −1 to +1. Additionally, the phase-shift (as specified) is introduced between and among the itemized components of the signal driving the probe. FIG. 7A shows—in dashed lines—nine plots 704 representing each of the driving sub-signals at these frequency components and in a solid line (710)—the resulting aggregate excitation force applied to the probe to displace it (or, analogously, a resulting aggregate displacement signal delivered to the probe by the electronic circuitry of the overall system).

Figure 7B:
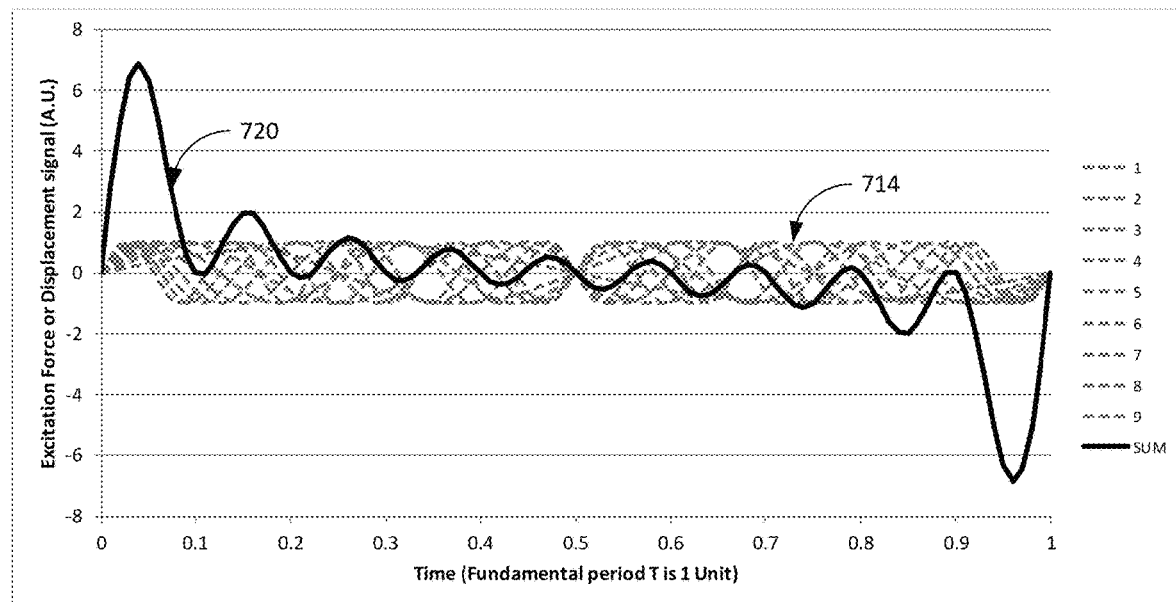

For the sake of comparison, Table 2 and FIG. 7B illustrate the situation when the probe is driven with the mix of 9 signals that represent the harmonics of the chosen fundamental frequency (of component #1 of Table 2) however these harmonic signals are simultaneously applied to the p[robe without any predetermined phase shift—in fact, with the same phase. FIG. 7B shows nine plots 714 (in dashed lines) representing the harmonic components, while the curve 720 shows the resulting excitation force applied to the tip of the probe.

The specialized electronic-circuitry control module 122 can generally be implemented in firmware on the basis of, for example, existing flexible AFM control with the use of a Field Programmable Gate Array (FPGA) and Digital Signal Processor (DSP), in one embodiment. In addition, the excitation signal provided to (as shown by lines 140A, 144A) and governing the operation of at least one of the probe Z-repositioner 140 and the sample Z-repositioner 144 (at a frequency preferably in the range from about a hundred Hz to 100 kHz) can also be routed by the AFM-nDMA control module 122 to a specialized "high-frequency" sample actuator/sample heater 148, as shown by the line 148A.

The AFM Digital Feedback electronic module 122 (in one embodiment realized with DSP, FPGA, or a combination of the two) may be configured with the use of a PID (Propor-

TABLE 1

| Component # | 1 | 2 | 3 | 4 | 5 | 6 | 7 | 8 | 9 | SUM |
|---|---|---|---|---|---|---|---|---|---|---|
| logF [log Hz] | 0 | 0.30103 | 0.477121 | 0.60206 | 0.69897 | 0.778151 | 0.845098 | 0.90309 | 0.954243 | MIX |
| \F [Hz] | 1 | 2 | 3 | 4 | 5 | 6 | 7 | 8 | 9 | MIX |
| \MaxVal | 1.0 | 1.0 | 1.0 | 1.0 | 1.0 | 1.0 | 1.0 | 1.0 | 1.0 | 3.9 |
| \MinVal | −1.0 | −1.0 | −1.0 | −1.0 | −1.0 | −1.0 | −1.0 | −1.0 | −1.0 | −4.0 |
| \Phase [deg] | 0.0 | −80.0 | 0.0 | 80.0 | 0.0 | 180.0 | 0.0 | −10.0 | 0.0 | MIX |
| t[s] | 1 | 2 | 3 | 4 | 5 | 6 | 7 | 8 | 9 | SUM |

TABLE 2

| Component # | 1 | 2 | 3 | 4 | 5 | 6 | 7 | 8 | 9 | SUM |
|---|---|---|---|---|---|---|---|---|---|---|
| logF [log Hz] | 0 | 0.30103 | 0.477121 | 0.60206 | 0.69897 | 0.778151 | 0.845098 | 0.90309 | 0.954243 | MIX |
| \F [Hz] | 1 | 2 | 3 | 4 | 5 | 6 | 7 | 8 | 9 | MIX |
| \MaxVal | 1.0 | 1.0 | 1.0 | 1.0 | 1.0 | 1.0 | 1.0 | 1.0 | 1.0 | 6.9 |
| \MinVal | −1.0 | −1.0 | −1.0 | −1.0 | −1.0 | −1.0 | −1.0 | −1.0 | −1.0 | −6.9 |
| t[s] \ | 1 | 2 | 3 | 4 | 5 | 6 | 7 | 8 | 9 | SUM |

In one example (see Table 1 and FIG. 7A), the probe is driven with an electrical signal combining 9 frequency components, among which the component #1 is considered to be a fundamental harmonic and the frequencies of the remaining components are harmonics of the frequency of the component #1. The amplitude of each of the frequency tional Integral Derivative) or PI (Proportional Integral) electronic-circuitry controller, which, in operation, receives as input the Deflection signal (shown as 150) or the signal from the Z-sensor (shown as 140 or 144, and generates a control output towards positioning a Z-scanner with the aim to minimize the difference (error signal) between the input and a setpoint. (Set point is understood as a desired value of the signal controlled in a feedback loop.) In case of a Deflection signal being an input, for example, the AFM will hold, maintain the load force at a chosen level; in case of the signal from the Z-sensor being an input, the AFM will hold/maintain the Z-position. When an AC signal is mixed into the setpoint (the situation referred to as setpoint modulation), the AFM digital feedback will follow the signal representing both DC and AC parts of the setpoint—for example, in a force-setpoint modulation regime.

The Signal routing control electronic circuitry 160 includes a digitally-controlled multiplexer configured to govern outputs and signal inputs, which is intended to realize various AFM control schemes and/or modes of operation: a force setpoint modulation, a z-setpoint modulation, and a z-modulation, for example. In operation of the system, this module 160 connects an input signal, a setpoint signal, a setpoint modulation signal to the AFM digital feedback module 130, and also routes a waveform from the appropriate DDS (Direct Digital Synthesizer—a generator of oscillatory waveform) 126A, 126B, and/or 126C and input signals (150, Deflection signal, and signal from Z- or Height sensor, not shown in FIG. 1) for acquisition and lock-in processing.

Figure 2:
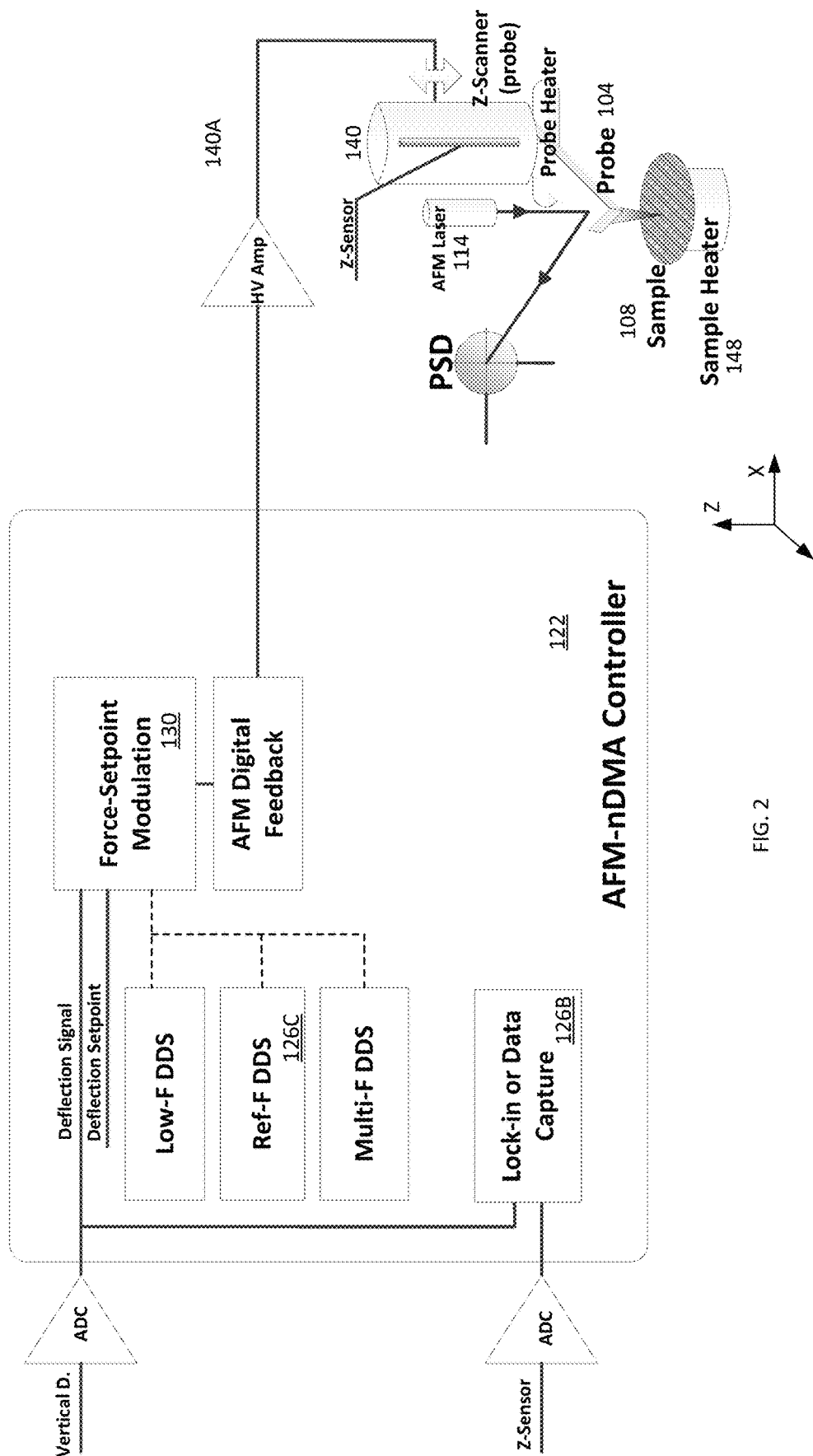
FIG. 2 is a schematic diagram of a specific version of the embodiment of FIG. 1, configured to implement the Force Setpoint Modulation modality.

FIG. 2 is a simplified schematic diagram 100' of a specific version of the embodiment 100 of FIG. 1, configured to implement the Force Setpoint Modulation mode of operation of the system. Here, the Deflection Setpoint is representing a desired, or target, value of the Deflection signal controlled by AFM feedback loop. Deflection Setpoint includes modulation component (setpoint modulation), is denoted as 152.

Sample Mounting.

The sample (sample under test, SUT, shown as 108 in FIG. 1) to be measured with an AFM-nDMA embodiment of the invention can be dimensioned as a thin (~few microns in thickness) section or slice of material, or, alternatively, as a bulk piece (for example, up to 3 mm in thickness) with a cryo-sectioned surface (a substantially flat block-face surface). For the purposes of implementation of the idea of the invention, the term "substantially flat" identifies a surface the spatial profile of which is characterized by an average peak-to-valley difference not exceeding 20 nm, more preferably not exceeding 10 nm.

Such substantially flat or substantially planar surface can be prepared with cryo-microtome sectioning, or with casting a thermosetting polymer onto Mica surface, or by spin-casting onto the surface of the sample a dissolved polymer, for example. The prepared sample section is mounted on a chosen substrate (such as, for example, a sapphire or stainless-steel disk of about 10 mm-to-12 mm in diameter and less than 1 mm in thickness, in one case) to form a sample-substrate assembly. The sample-substrate assembly can then secured in the heater-cooler device with the use of magnetic attachment or with thermal compound grease.

Examples of System Configuration for Temperature-Dependent Measurements

It is appreciated that AFM-nDMA measurements of a sample at variable temperatures may generally require a sample heater/cooler device (shown as 148; interchangeably referred to as heater or heater device, for simplicity). It may be desirable to utilize a sample heater specifically designed for highly spatially-localized/focused containment of thermal gradient in the area of the sample only, in which case only the sample is heated up as opposed to heating the whole sample and AFM stage mechanical structure, to minimize overall thermal drift).

According to the idea of the invention, such judiciously-designed sample heater/cooler circuitry is configured to achieve low levels of thermal drift rate in lateral and vertical spatial directions (x-, y-, and z-directions, in reference to the local coordinate system of FIG. 1), in equilibrium state of the thermal gradient. (The term "low drift rate" defines and refers to such drift observed during the measurement time the spatial value of which is small as compared to dimensions of measured nanoscale features. To determine the value of the lateral drift, it can be compared to contact radius/contact size, and the value of vertical drift can be compared to indentation depth/sample deformation depth.) Such practical result, in turn, advantageously affects the quality and/or precision of spatially-resolved AFM-nDMA measurements because it allows to measure the sample properties at specifically-targeted locations on or at the sample.

(A person of skill will readily appreciate that the thermal drift in the cooler/heater manifests in lateral (XY) or vertical (Z) drift of relative position of a probe vs. sample. Drift rate is measured as a position change per unit time. Lateral drift represents the speed at which the XY position of probe relative to sample is changing. Vertical drift, or simply Z-drift, would indicate how fast the vertical position of a probe vs. sample is changing.)

In addition to the sample heater device, a dedicated heater of the probe (the probe heater, shown as 154) is utilized to facilitate localization of the thermal gradient (top and down heater plates, one below and one above the sample, from both sides of the sample) and prevent the probe lever 104 from accumulating the condensation deposits. Accordingly, in one implementation, the probe heater device 154 may include first and second heater plates disposed in cooperation with the top and bottom surfaces of the sample.

Alternatively or in addition, the calibration of the sample-surface temperature (with respect to a heater 148 setpoint and temperature measured by a dedicated sensor that is internal to the heating element of the heater 148) can be realized in practice with the aid of a small thermocouple attached to the surface of the sample carrier (not shown in FIG. 1; configured, in one example, as a 10 mm diameter sapphire disk or a steel puck) mechanically-supporting and carrying the sample, in proximity to the location of the sample 108 on the sample carrier.

As a Non-Limiting Example:

In order to measure material's viscoelastic properties as a function of temperature (for example, in a range from room temperature RT to an upper limit of the range—for example, 250 deg C.), the embodiment 100 of the AFM-nDMA system can be optionally equipped with the Sample Heater holder/Sample Actuator 148 containing electronic circuitry designed to ensure a low thermal drift (on the order of 2 nm/minute or lower) of a reference surface of the holder 148 in X-, Y- and Z-directions). When such sample heater holder is used, the sample 108 is cooperated with the reference surface, and the temperature of the heater of the holder 148 is controlled with a thermal controller (not shown for simplicity of illustration) that establishes programmable temperature setpoint and feedback (for example, the PID-feedback, or Proportional Integral Derivative controller/feedback). The use of such sample holder that is equipped with the judiciously-devised electronic heating circuitry facilitates the measurement of viscoelastic properties of the sample 108 at a substantially any pre-determined temperature in the range of temperatures spanning through glass transition of certain polymeric materials (with the glass transition temperature, Tg, falling into the heater's temperature space, for example, from the RT to 250 deg C.). For example, for Poly-methyl methacrylate (PMMA) material with glass transition temperature around 105° C., a preferred pre-determined temperature would be within a range from room temperature (of about 25° C.) to the upper limit of about 140° C.-150° C.

Preferably, the system 100 may also be equipped with a top plate heater, or probe heater 154, configured to maintain a low thermal gradient in the space of probe-sample.

Notably, to implement the AFM-nDMA measurements on materials with Tg that is below room temperature, it may be desirable to lower the temperature of the sample by cooling. (Such is the example in the case of Polypropylene that has glass transition in the range −20° C. to −5° C., Polyvinylethylene that has glass transition temperature around −20° C., or Polymethyltolylsiloxane that has glass transition temperature around −12° C.) A Heater-Cooler hardware option (not shown in detail) addresses the temperature space below RT, for example from the RT to −35 deg C.

For operation with Heater or Heater-Cooler hardware described above, the AFM scanning mechanism (whether the Z-scanner 144 of the sample, and/or the Z-scanner 140 of the AFM probe 104, depending on the particular implementation) must be well thermally-insulated from the source of the heating/cooling—otherwise, the scanner performance (drift, calibration, dynamics, etc.) are likely to be diversely and adversely affected throughout the temperature space. The desired thermal insulation can be achieved, in one case, with the use of a specialized probe holder made out of material with low thermal conductivity (for example, MACOR, a machinable ceramic material). On the other hand, the AFM tip 104A should at the same time be preferably maintained at a temperature close to the temperature at which the sample 108 is kept, in order to prevent the formation of condensation on the lever surface(s), thermal bending of the lever, from sample local cooling and from thermal gradients. (Notably, systems of related art are not known for balancing these two distinctive requirements and conditions.) Keeping the tip 104A at the temperature substantially equal to the temperature of the sample 108 can be achieved (for a heater) with the use of a Tip heater hardware in the probe holder, which constitutes a heater element (and optionally, a thermocouple or other temperature sensor) under the so-called probe nest (that is, under the portion of the probe where the probe chip is spring-clipped or otherwise attached to the probe holder).

The use of the Heater-Cooler option in the embodiment of the AFM-nDMA system preferably additionally requires environmental control (humidity control—RH, and inert atmosphere, e.g., dry Nitrogen purge) to prevent the sample surface from oxidation and deterioration due to moisture absorption. In the simplest case, such environmental control can be achieved with the use of a flexible sealing sleeve attached to the probe holder, which sleeve creates an insulated local environment that can be purged with dry Nitrogen gas at a low flow rate. Alternatively, a specialized sealed Local Environmental Cell (LEC, incorporating heatercooler) can be used.

A Sample Holder Actuator Configured for Measurements at Room Temperature Only

When the "heater-cooler" hardware option discussed above is implemented and used, the system is configured to hold the sample stationary, fixed in space while the AFM-nDMA-caused mechanical excitation is delivered via the spatial actuation of the tip 104. (This is accomplished either with the use of the AFM Z-scanner 140, or with an additional probe-holder piezo actuator). It is recognized, however, that when the measurements are intended to be performed only at room temperature, the mechanical excitation or actuation of the mutual orientation between the sample 108 and the tip 104 can be alternatively carried out via (harmonic, small amplitude) spatial actuation of the sample holder. Accordingly, the combination of the sample holder actuator 148 and the sample Z-scanner device 144 is judiciously designed to operate by causing the mechanical movements of the sample 108 at least at one frequency within a wide frequency range (for example, from about 100 Hz to about 100 kHz). Unlike the AFM Z scanner 140, the (sample holder actuator 148 and/or the sample Z-scanner device 144 typically do not have an associated Z-sensor configured to detect and provide a readout of the mechanical vibration amplitude and phase of the mechanical movements. Instead, the amplitude and phase of the mechanical movement provided by the devices 144 and/or 148 as a function of frequency can be calibrated in a separate, additional reference "calibration" measurement by placing the AFM probe in contact with a hard reference sample and measuring the deflection of the probe (that is, the amplitude and/or the phase of such deflection).

The AFM-nDMA Methodology: Operational Features

An embodiment of the AFM-nDMA system of the invention is configured to measure viscoelastic properties at (user-) selected point locations on the sample's surface. (Notably, unlike and in contradistinction with most of conventional AFM modalities, the embodiment of the AFM-nDMA methodology of the invention is generally not a surface imaging technique, although an imaging mode with "mapping" of viscoelastic properties in limited frequency range is possible. Indeed, the primary target of the proposed methodology is point measurements/point spectroscopy (multi-frequency) applications, but it can also be used for surface imaging/mapping at a single selected frequency, or a limited number of selected frequencies.)

"Ramp" (or Forward Ramp) mode of operation. At each point location on the surface of the sample under test, an AFM nanoindentation measurement is performed. Here, the Z scanner 140 is spatially extended along the z-axis to bring the tip 104A of the probe 104 toward the surface of the sample 108 (a ramp motion) until a specified and/or predetermined threshold value in a probe's cantilever deflection is reached as detected with the use of the PSD 118. The pre-set of the cantilever deflection corresponds to the specific pre-load (normal) force (referred to as Trigger Force) exerted by the probe tip 104A onto the sample 108, which in turn allows the system 100 to determine the sought-after sample deformation under the corresponding load.

"Hold" mode of operation. After pre-load force threshold is reached, Z-ramp activity is ceased/stopped and the probe 104 is kept (stays) on "hold" for a specified duration of time. (With AFM-nDMA excitation present, such duration is specified according to the number of required cycles at a frequency of selected for the measurement. As a non-limiting example, the probe may be "held" for 20 cycles at 0.1 Hz, or 200 seconds.) This is the segment of operation during which the AFM-nDMA modulation/excitation is turned on. Several variations of the "Hold" modality are within the scope of the invention:

"Hold Force" mode of operation. Here, the AFM feedback electronic circuitry maintains the cantilever deflection (force applied to the cantilever) constant at specified target value (typically, at the pre-load force value), while creep of the Z piezo element, thermal drift, material creep under load are compensated as a result of and by adjusting the Z position of the probe 104 with the AFM feedback circuitry.

"Hold Z sensor" mode of operation. In this mode, the AFM feedback circuitry maintains the mechanical extension of the Z-scanner 140 (along the z-axis) substantially constant, by using the Z sensor associated with the Z-scanner 140. The Z piezo creep is dynamically compensated, while the Z sensor drift, thermal drift, material creep are not compensated. In this mode of operation, force applied to the sample does not necessarily remain constant, and, as a result, the use of the "hold Z sensor" mode of operation is preferred for not prolonged periods of time. (Notably, this mode of operation may be of use in the case of adhesion creep or adhesion force creep. In such a case, holding the position constant may work better than holding deflection/force constant, where in the latter case the adhesion force creep can "suck in" the probe into the surface, causing a deep indentation hole.)

"Hold Z drive" mode of operation. Here, the Z piezo high-voltage is held constant, while the AFM feedback circuitry signal is off; as a result, there is no compensation provided, and accordingly this mode of operation is preferably used during short periods of time to avoid piezo creep. This mode of operation is intended for fast measurements at a relatively high frequency (for instance, at a frequency exceeding 100 Hz, that is in a regime where other feedback-based modes of operation may not keep up/track the performance at the modulation frequency.)

"Retract" (or Reverse Ramp) mode of operation. At the end of the "Hold" segment of operation, the probe 104 is retracted from the surface of the sample 108. A retraction curve is recorded with the use of a programmable processor operably cooperated with the PSD 118. For viscoelastic materials, the rate of retraction an important parameter that may affect the accuracy of JKR model analysis (discussed below).

A skilled artisan will also readily appreciate that the proposed AFM-nDMA methodology should not and cannot be confused with the "tapping" mode of operation of the conventional AFM system: tapping mode is a different, intermittent-contact AFM technique. In the AFM-nDMA modality of the present invention, a probe is caused to approach the surface of the sample to make full contact and to actually deform/indent the surface, after which the modulation—an oscillatory component of force or Z displacement—is turned on. At the end of the Hold period of operation, the probe is retracted; then the probe can move/transition to another point of the surface laterally, and be used to perform another point-measurement at another location of the surface.

"Force-distance curve" ("FDC"). The AFM Force-distance curves (also known as Deflection vs. Z scanner extension) are recorded during forward ramp and reverse ramp (retraction of the probe). As will be immediately recognized by the skilled artisan, a Force-Distance Curve is a plot or trace of Deflection/Force signal vs. Z-separation signal, acquired as the Z-scanner 140 moves the tip 104A towards the sample surface (~the Extension curve) or moves the tip 104A away from the prior contact with the surface (~the Retraction curve). FDCs can be analyzed with a Contact Mechanics Model (such as one represented by any of the Hertzian, Johnson-Kendall-Roberts (JKR), Derjaguin-Muller-Toporov (DMT) models) in order to calculate the elastic properties (such as reduced modulus and Young modulus) of the sample and, more importantly for the AFM-nDMA embodiment of the invention, to estimate the size of the tip-sample contact area, or "contact radius". (As a reference, the reader is referred to, for example, K. L. Johnson and K. Kendall and A. D. Roberts, Surface energy and the contact of elastic solids, Proc. R. Soc. Lond. A 324 (1971) 301-313; or Derjaguin, B V and Muller, V M and Toporov, Y. P., 1975, Effect of contact deformations on the adhesion of particles, Journal of Colloid and Interface Science, 53(2), pp. 314-326.)

In case of the sample being represented by a polymer material with strong adhesion, the JKR model typically provides best results in fitting experimental data. (In a preferred situation, force-distance curves on viscoelastic materials should be analyzed with a contact mechanics model for viscoelastic adhesive surfaces.) A contact radius calculated from a retraction curve applies only to conditions at the very end of the Hold period, and does not really provide information about the contact radius for every moment during or within the whole Hold period, which may be necessary for accurate quantitative AFM-nDMA results.

The contact area (between the tip and the sample) can change during Hold/measurement time because of the sample creep. The dynamic stiffness (of the contact between the probe and the sample, measured at a preselected "reference" frequency) is proportional to the contact radius. If the system is configured to monitor this dynamic stiffness (continuously or in the "interleaved" with the major measurements fashion) during the whole Hold/measurement time, then the determination of a relative change in the contact radius can be carried out during the measurement. The contact radius is determined after or before the Hold period from a force-distance indentation curve (Ramp); then this correction of the contact radius is applied to each specific moment of the Hold period.

"Temperature Step". The ramp-and-hold based measurements are performed with the use of the AFM-nDMA embodiment of the invention at a substantially constant temperature, after thermal equilibrium in the system of instrument-sample-heater has been reached. The AFM-nDMA measurements as a function of temperature, on the other hand, are carried out by sequentially going through a list of temperature setpoints/steps (according to a specific temperature program), and waiting for reaching the thermal equilibrium at each temperature setpoint before performing the AFM-nDMA ramp-and-hold point measurements at that temperature point. The degree of thermal equilibrium that has been reached before the ramp- and hold measurements can commence can be assessed by measuring the rate of thermal drift in the Z direction, for example while waiting and performing "zero-size" scans on the surface in Peak-Force Tapping AFM mode (and optionally, assessing XY drift by performing non-zero-size scans and tracking a topographical feature or a boundary feature in a map of material property like DMT-modulus or adhesion or deformation), until a desired (low) drift rate figure is reached.

While waiting for thermal equilibration and staying in the AFM feedback loop on the surface, the Z scanner 140 may reach a limit in extension or retraction of the Z piezo due to thermal drift and material thermal expansion/contraction/flow. Accordingly, it is preferred to have the Z scanner continuously re-centered by stepping the Z engage motor up or down, so that the scanner's Z position is maintained in the center of the piezo's dynamic range.

Figure 3A:
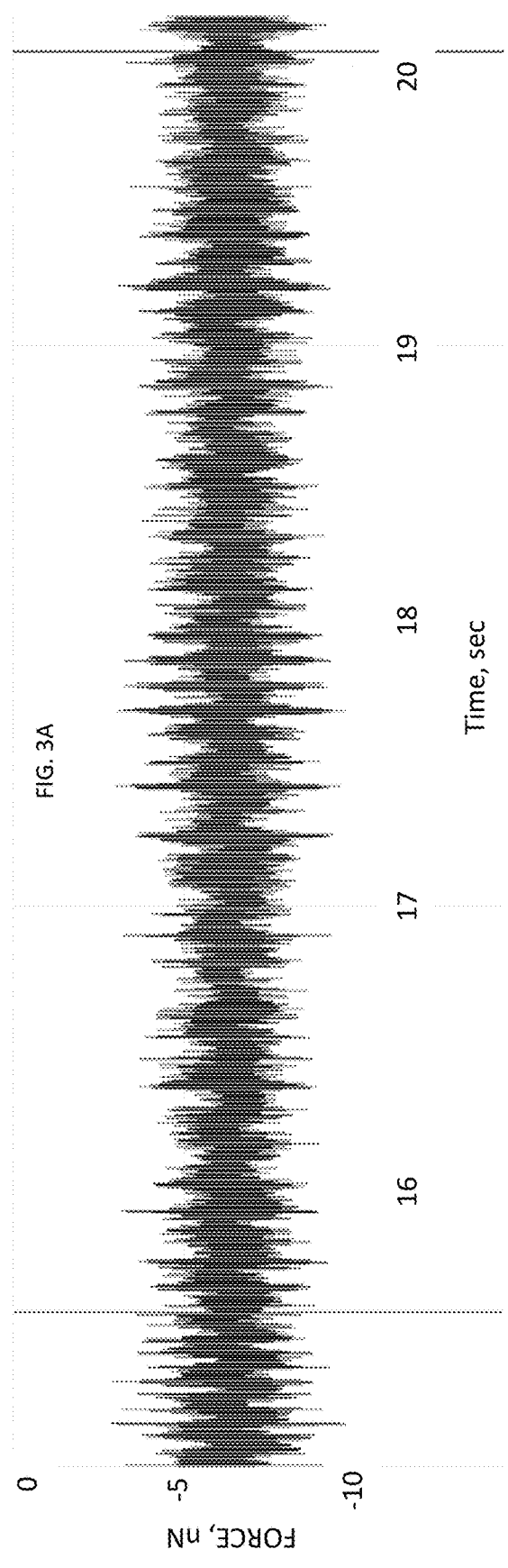
Figure 3B:
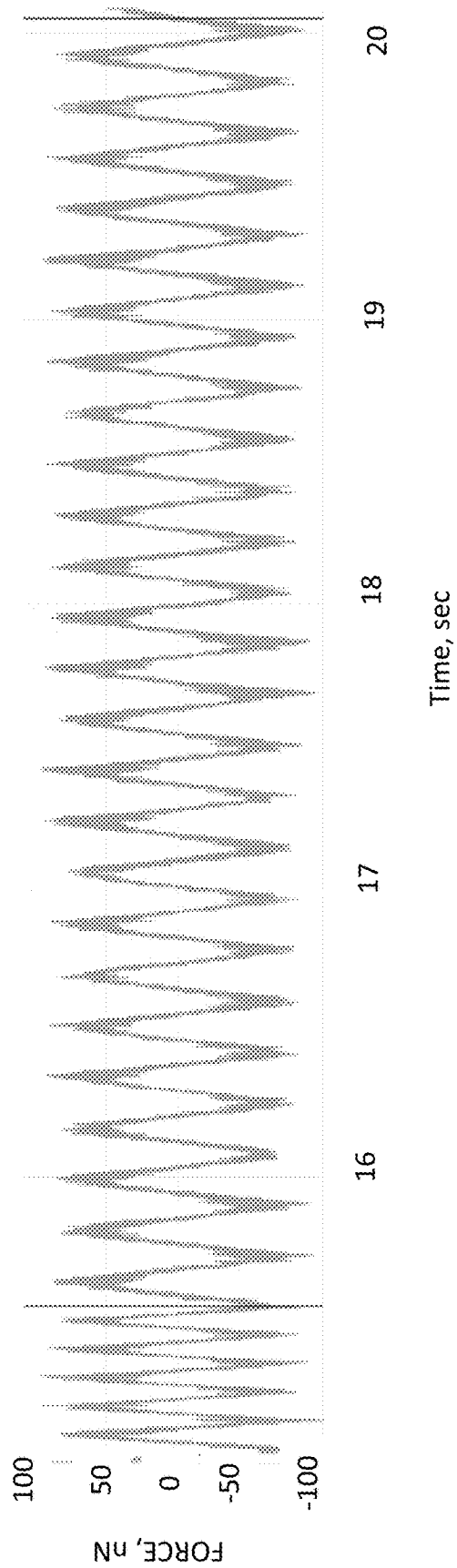
Figure 3C:
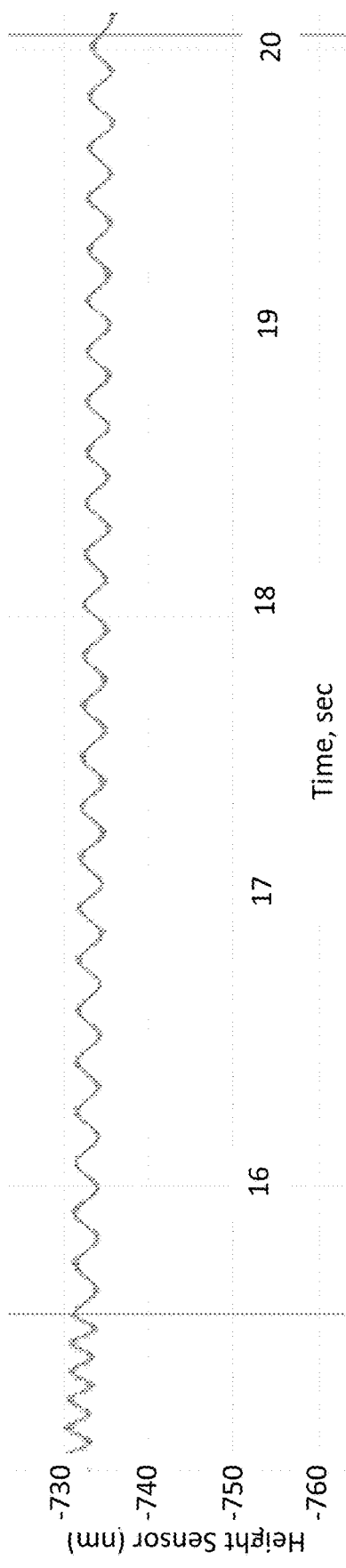

FIGS. 3A, 3B, and 3C provide examples of Signal Traces for Force Setpoint Modulation. Here, in Force setpoint modulation mode of operation, the AFM feedback electronic module is tracking both static ("DC") and dynamic, oscillatory ("AC") component of the setpoint. The error signal trace (provided by the AFM feedback control electronic circuitry 130 of the system 100 of FIG. 1) and shown in FIG. 3A possesses a high-frequency noise and a very small residual oscillatory (AC) error (these data example was acquired at the modulation frequency of 5.6 Hz), and the residual possesses a high level of noise. These results illustrate that AFM feedback circuitry 130 is tracking the oscillatory setpoint component and provides a modulation of the load force exerted by the probe 104 onto the sample 108 (which constitutes the "force setpoint modulation" mode of operation). The actual vertical deflection trace in FIG. 3B shows the oscillatory (AC) component—that is, the force modulation (here the normal force exerted by the probe on the sample is equal to vertical deflection of the lever multiplied by the lever's spring constant). The Z-sensor or "Height" signal trace is shown in FIG. 3C. Here, an overall downward slope in the trace line can be attributed to a thermal drift of the system and/or a viscoelastic creep in the sample material (The drift correction technique described in Software Lock-in processing method is useful in alleviating the detrimental effect of such slope/trend on the accuracy of signal's amplitude and phase measurement).

Figure 3D:
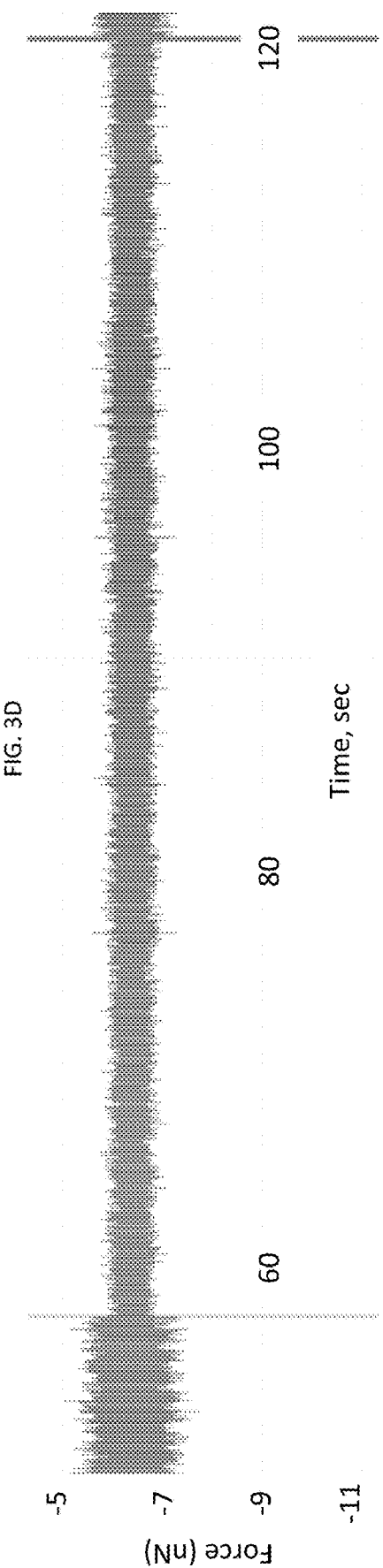

Data presented in FIGS. 3D, 3E, and 3F are analogous to those of FIGS. 3A, 3B, and 3C, but represent an example corresponding to a measurement at a different, lower modulation frequency –0.32 Hz (vs 5.6 Hz of FIGS. 3A, 3B, 3C). Notably, the residual oscillatory (AC) component in the error signal trace in FIG. 3D is practically not discernible in the noise, in contrast to that of FIG. 3A. This fact is due to AFM feedback control frequency response (dependent on PID-feedback gains) and effective better feedback tracking at lower frequencies as compared to higher frequencies. The Z-sensor "Height" signal trace in FIG. 3F, as compared to FIG. 3C, shows a more pronounced downward drift/creep trend due to a much longer measurement time (approx. 60 seconds) at a lower frequency of 0.32 Hz, as compared to a shorter measurement time (approx. 4.5 seconds) at 5.6 Hz in FIG. 3C. This illustrates that the Drift Correction processing described in Software Lock-in method is particularly important at low frequencies that require a considerable measurement time.

Figure 4A:
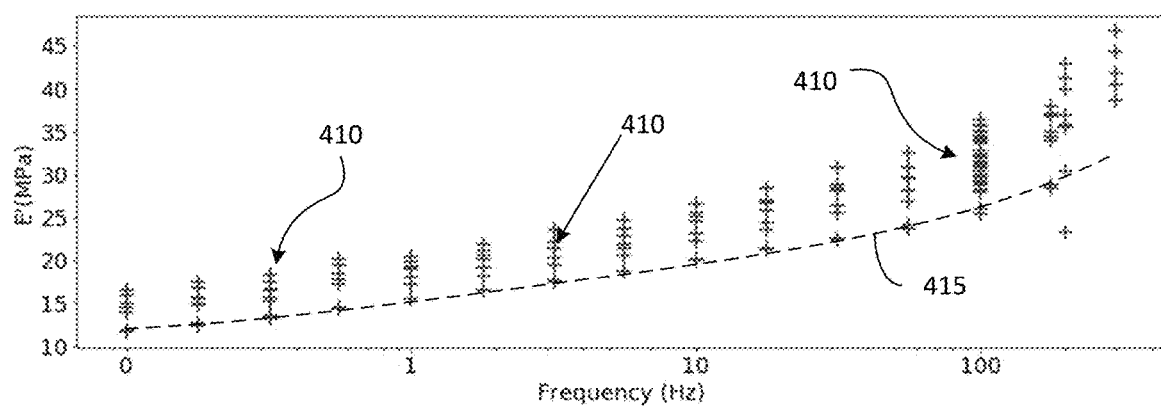
FIGS. 4A and 4B illustrate dependencies of the Storage Modulus and of the Loss Modulus on low frequencies (at fixed temperature) for Polydimethylsiloxane (PDMS). The comparison is provided between the results of the measurement performed with an AFM-nDMA-based embodiment of the invention and those performed with a conventional bulk DMA methodology.
Figure 4B:
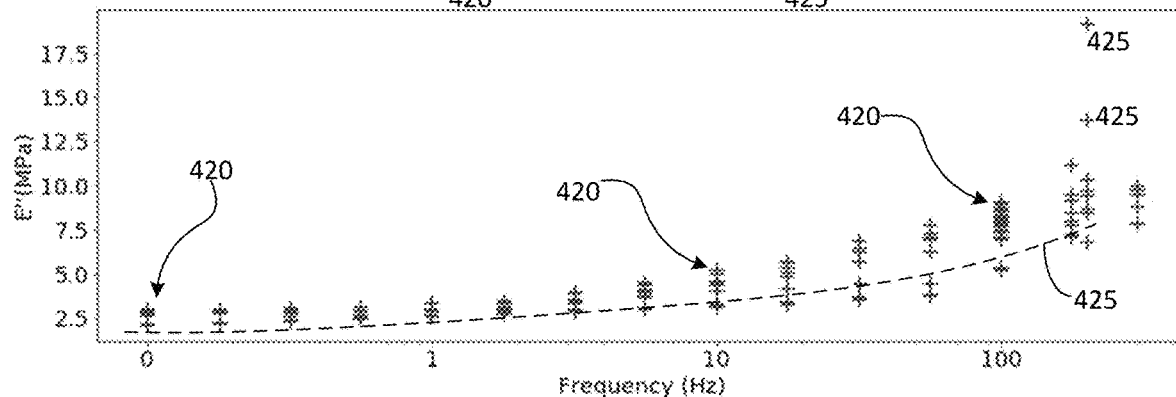

FIGS. 4A, 4B illustrate results of experimental AFM-nDMA measurements performed with an embodiment of the system of the invention. FIG. 4A shows Storage (E') and FIG. 4B shows Loss (E") modulus data vs. measurement Frequency (at fixed, room temperature), for a sample of Polydimethylsiloxane (PDMS) material. The comparison of AFM-nDMA results (red, crosses, 410 and 420) to bulk DMA measurements (green, dashed line, 415, 425) on a sample from the same material shows substantial agreement between storage and loss moduli measured at nanoscale (AFM-nDMA) and using bulk macroscopic methods (DMA) (the latter being used in related art as ground truth, a reference to verify other results).

Figure 5A:
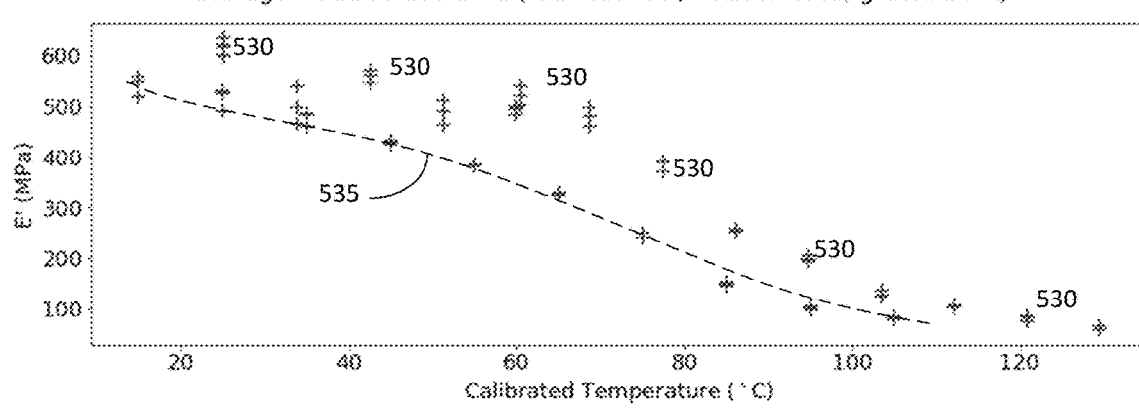
Figure 5B:
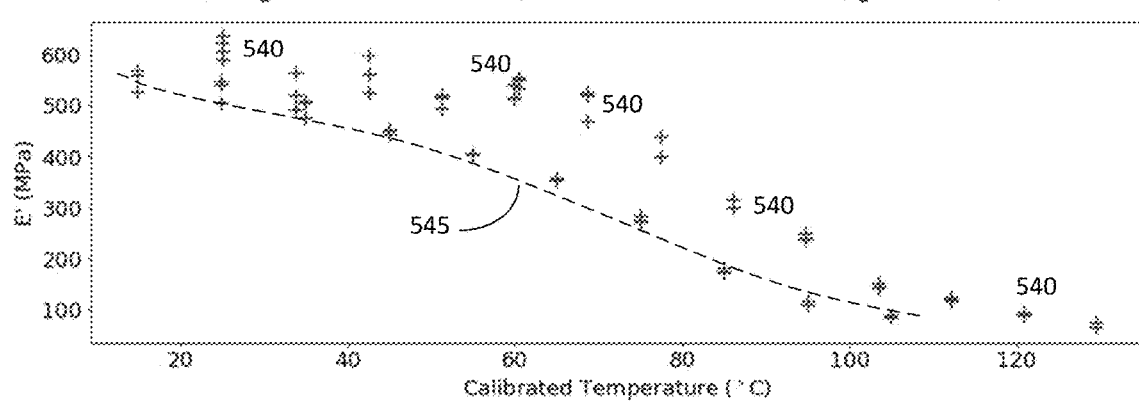
Figure 5C:
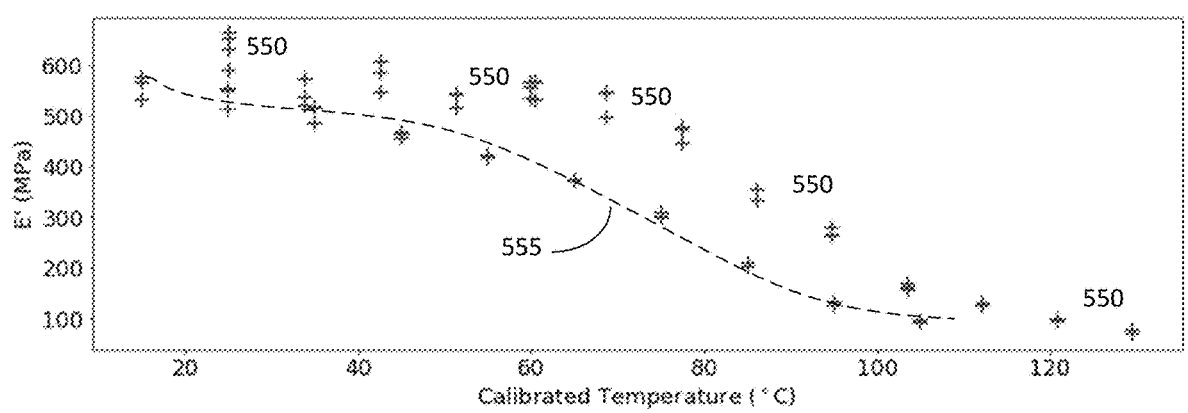

FIGS. 5A, 5B, 5C, 5D, 5E, 5F, illustrate results of the experimental AFM-nDMA measurements of the Storage and Loss Moduli of the Fluorinated Ethylene Propylene (FEP) material as a function of temperature (at three different fixed low frequencies: 0.1 Hz, 1.0 Hz, and 5.6 Hz). The comparison is provided between the results of the measurement performed with an AFM-nDMA-based embodiment of the invention and those performed with a conventional bulk DMA methodology. FIGS. 5A, 5B, 5C show dependence of storage modulus vs. temperature, while FIGS. 5D, 5E, and 5F show the dependence of loss modulus vs. temperature for FEP material sample, measured at three different frequencies (within the range from 0.1 Hz to 10 Hz) with the use of the nanoscale AFM-nDMA method according to the present invention and the bulk macroscopic DMA technique. The comparison of the AFM-nDMA (red, crosses, 530, 540, 550, 560, 570, 580) and bulk DMA (green, dashed lines, 535, 545, 555, 565, 575, 585) data demonstrates that both techniques detect a pronounced drop in storage modulus values with increasing temperature, and also detect a shift of a loss modulus peak towards higher temperatures as measurement frequency increases—consistently with expected rheological behavior of the FEP material. Accordingly, glass transition of FEP can be and is detected with both the conventional bulk DMA technique and the proposed AFM-nDMA technique.

Figure 6D:
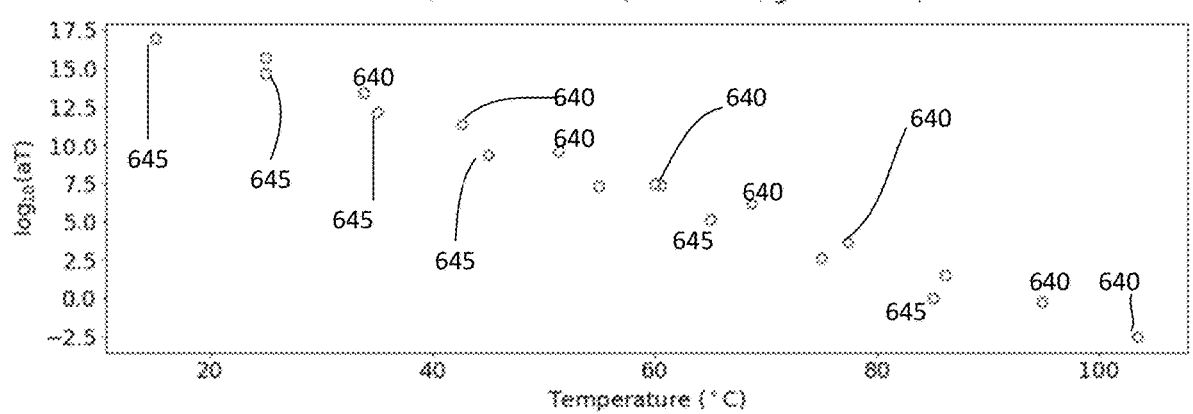
FIG. 6D illustrates an example of time-temperature superposition (TTS) of shift factors with the comparison between the results of a measurement performed with the use of an embodiment of the invention with those of a measurement performed with the conventional bulk DMA methodology.

FIG. 6A illustrates the experimentally-defined dependency of loss tangent (the ratio, of the loss modulus to the storage modulus) for FEP, on frequency, presented via the time-temperature superposition (TTS). The comparison is provided between the results of the measurement performed with an AFM-nDMA-based embodiment of the invention (610) and those performed with a conventional bulk DMA methodology (615). FIGS. 6B, 6C illustrate, respectively, the dependencies of the Storage Modulus and the Loss Modulus on frequency (corresponding to the graph of FIG. 6A), that are presented via the time-temperature superposition (TTS). Here, the comparison is provided between the results of the measurement performed with an AFM-nDMA-based embodiment of the invention (620, 630) and those performed with a conventional bulk DMA methodology (625, 635). FIG. 6D illustrates an example of time-temperature superposition (TTS) of shift factors (well known by a person of skill in the art) with the comparison between the results of a measurement performed with the use of an embodiment of the invention (open circles; 640) with those of a measurement performed with the conventional bulk DMA methodology (solid circles; 645).

In reference to FIGS. 6A, 6B, 6C, and 6D, data were measured with both the nanoscale AFM-nDMA methodology configured according to the idea of the invention and with the conventional macroscopic bulk DMA method (for the same Fluorinated ethylene propylene, FEP, material as that in the examples of FIGS. 5A through 5F discussed above) in the frequency range from 0.1 Hz to that above 100 Hz, and in the temperature range from room temperature to a temperature exceeding 120 deg. C. Those data for all temperatures and frequencies are super-imposed via Time-Temperature Superposition (TTS), which is a rheological data analysis technique commonly used for macroscopic measurements, and plotted on a scale of "TTS-shifted" frequency. FIG. 6A shows a TTS-plot of loss tangent ("tan delta") vs. shifted frequency; FIGS. 6A and 6B show a TTS-plot of storage and loss modulus, respectively. FIG. 6D illustrates the TTS "shift factors" that were applied to frequencies during TTS processing. As evidenced by FIGS. 6A-6D, the disclosed AFM-nDMA methodology provides a novel and unique capability (with respect to nanoscale measurements at low frequencies) that allows for a direct comparison with the results obtained via traditional, bulk macroscopic rheological techniques and methods such as DMA and TTS. To the best knowledge of the inventors, these AFM-nDMA results are the first example of time-temperature superposition data at nanoscale via AFM).

Additional Notes: AFM-nDMA Modulation/Excitation. Addressing Frequency Space.

Operation in Frequency Range: 0.1 Hz-10 Hz (Force Setpoint modulation). Measuring at low frequency is associated with long measurement time (covering at least ten cycles of excitation frequency). Therefore, Hold Force mode is preferred, which can maintain the load force condition constant despite drift and creep. On another hand, active AFM feedback will counteract any modulation introduced into Z channel, effectively negating mechanical excitation and rendering measurement useless. Instead of Z modulation, Force Setpoint modulation should be used at low frequencies (falling in the range of active AFM feedback bandwidth). In Force Setpoint modulation, AFM feedback tracks both DC pre-load force setpoint and AC periodic modulation component, which provides the necessary mechanical excitation. Force setpoint modulation scheme can be realized in FPGA firmware with addition of a low-frequency Direct Digital Synthesis (DDS) component. Amplitudes and phases of Force and Displacement (Deformation) can be measured via two channels, Deflection and Z sensor, either via hardware lock-in in FPGA or by capturing/recording signal traces and demodulating them with drift- and creep-corrected "software lock-in" methodology realized in software ("Software Lock-in").

Operation in Frequency Range from about 10 Hz-100 Hz (Force Setpoint and/or Z scanner modulation). Hold period in this frequency range can be relatively short, and Hold Z drive mode (or Hold Z Sensor with AFM feedback tracking both DC position and AC modulation in Z Sensor channel) can be acceptable for low or moderate drift and creep rates. Therefore, Z scanner modulation (with Hold Z Sensor or Hold Z drive) can be used. Alternatively, Force Setpoint modulation can be used, since AFM feedback can have sufficient bandwidth to track AC setpoint in this frequency range.

Operation in Frequency Range from about 100 Hz to about 1000 Hz (Z modulation). AFM feedback may have trouble with tracking AC setpoint at frequencies above 100 Hz, resulting in inefficient excitation (considerable part of modulation amplitude ending up in the residual error signal). Z modulation is preferred.

Reference frequency technique for correcting (subtracting the value of, in one case) the creep in contact area and/or tracking the contact area during the process of correction of the associated creep. If AFM-nDMA, the modulus of the material at one particular frequency is measured (monitored) throughout the whole duration of Hold segment, in parallel with AFM-nDMA measurements at other frequencies, then contact radius calculated from JKR fit of retraction curve at the end of Hold can be corrected (creep in contact size during hold can be accounted for). This requires excitation at at least two frequencies simultaneously. Alternatively, measurements at reference frequency can be interleaved with measurements at other frequencies.

Multi-frequency excitation. Multi-frequency excitation can shorten AFM-nDMA measurement time. When superposition principle applies, results of multi-frequency excitation should be equivalent to sequential measurements (provided drift and creep are properly accounted for in the latter). In case of nonlinearities (which are inherently present in the tip-sample contact), a "cross-talk" between frequencies is possible during multi-frequency excitation.

AFM-nDMA Model Equations ("Dynamic Stiffness in Harmonic Excitation")

As was already alluded to above, the AFM-nDMA is a nanoscale Dynamic Mechanical Analysis of a sample that is performed with the aid of a cantilevered probe indenting the sample surface with a controlled force that includes both a quasi-static (DC) component and a dynamic (AC), oscillatory component. The frequency, or multiple frequencies, of the oscillatory component of the force applied to the sample is judiciously chosen to match the low frequency range that is usually of interest for bulk macroscopic DMA of soft materials and various polymers—from sub-Hertz to several hundred Hertz.

Embodiment of the AFM-nDMA system of the invention is configured to operate in several different regimes:

1. A Regime or Mode of Force Setpoint Modulation: Here, the AFM feedback is turned on to monitor the deflection of the probe cantilever and to maintain both the DC force ("pre-load force") and the AC oscillatory modulation component. This regime is ideal for low frequency AFM-nDMA experiments (sub-Hertz to several hundred Hertz), because it allows the user to maintain stable conditions of the tip-sample contact despite drift and sample creep. The oscillatory displacement is measured by AFM Height Sensor. Note that for fixed predetermined amplitude of force modulation, the amplitude of Z scanner displacement (Height Sensor) generally depends on sample's viscoelastic properties.

2. A Regime of Mode of Displacement (or "Z" modulation): Indentation ramp is stopped at the predetermined Trigger Force (preload), but AFM feedback is not activated. The scanner Z displacement is modulated at fixed predetermined amplitude; the amplitude of force AC component (deflection) thus depends on viscoelastic properties of sample material. This regime is best suited for fast Force Volume AFM-nDMA experiments, where measurement frequency can be in the range from around hundred to several hundred Hertz, and a contact time duration is relatively short.

3. A Regime of Mode of External Actuator: Here, the sample is attached to the High Frequency Actuator (HFA) stage. The AFM probe is ramped towards sample surface and held at a position (in the closed-loop feedback on Height Sensor signal) where the predetermined preload force is present. The actuator is excited and provides modulation of vertical (Z) displacement of the sample surface with respect to the AFM probe base that is held in a stationary position via the Height Sensor feedback loop. The AFM vertical deflection signal is recorded and provides information about the oscillatory portion of the force in probe-sample contact in response to modulation of separation distance (separation between the probe base and the sample surface). There is no sensor measuring amplitude and phase of actuator vibrations, therefore calibration must be used.

For all these system configurations, the operation of an embodiment of the present invention results in assessment of viscoelastic material properties of the material of the sample using one common theoretical framework (referred to as "Dynamic Stiffness in harmonic excitation") based on the equations for both inverse and forward problem of nanoscale Dynamic Mechanical Analysis. Inverse problem equations allow for calculation of dynamic stiffness of the contact, and from that material properties like storage and loss modulus and tan delta (loss tangent, damping factor) from the results of the AFM-nDMA measurements that provide for amplitudes and phases of the acquired signals. The forward problem equations can be utilized for optimization of an experiment by calculating a desired excitation amplitude and pre-load force.

For simplicity, one common notation set (for equations describing AFM-nDMA theory and calculations) is used to describe all three regimes introduced above, with Z modulation via either the Z scanner or the sample actuator. Assume that the Z displacement of the probe base (relative to sample surface; sometimes also referred to as "separation distance") is described by a harmonic signal (in complex-valued form):

$$z(t) = Z_1 e^{i(\omega t + \psi)} + Z_0 \quad [\text{Eq. 1}]$$

where $Z_1$, $\psi$ are the amplitude and phase of the displacement oscillatory component at a frequency $\omega = 2\pi f$. The probe is considered to be calibrated and known, and possessing the probe's spring constant $K_c$. Assuming further that the system is linear (in that it produces a harmonic response to harmonic excitation), the AFM probe deflection can also be described by a harmonic signal (this is a measured value; vertical deflection signal):

$$d(t) = D_1 e^{i(\omega t + \varphi)} + D_0 \quad [\text{Eq. 2}]$$

Here, $D_1$, $\varphi$ are, respectively, the amplitude and phase of deflection oscillatory component at frequency $\omega = 2\pi f$.

General equations for AFM-nDMA calculations can be derived using the definition of Dynamic Stiffness (of contact between the probe and sample), which is simply an extension of definition of stiffness to harmonic, complex-valued case: Dynamic Stiffness S* (in Newton/meter units) is defined as the ratio of the complex-valued force to the complex-valued deformation caused by this force:

$$S^* = F^*/L^* \quad [\text{Eq. 3}]$$

The oscillatory deformation can then be determined as a difference between displacement and probe deflection, or in complex-valued form:

$$L^* = Z_1 e^{i(\omega t + \psi)} - D_1 e^{i(\omega t + \varphi)} \quad [\text{Eq. 4}]$$

When the cantilever spring constant ($K_c$) is known, an oscillatory force is determined from the deflection:

$$F^* = K_c D_1 e^{i(\omega t + \varphi)} \quad [\text{Eq. 5}]$$

Eq. 3 for Dynamic Stiffness can be therefore re-written as:

$$S^* = S' + iS'' = K_c D_1 e^{i(\omega t + \varphi)} / [Z_1 e^{i(\omega t + \psi)} - D_1 e^{i(\omega t + \varphi)}] \quad [\text{Eq. 6}]$$

Applying some algebraic manipulations to complex-valued expression and separating real and imaginary parts, Eq. 6 leads to:

[Eq. 7.1, Storage Stiffness]

$$S' = \frac{K_C D_1}{Z_1} \frac{\cos(\varphi - \psi) - (D_1/Z_1)}{(D_1/Z_1)^2 - 2(D_1/Z_1)\cos(\varphi - \psi) + 1}$$

[Eq. 7.2, Loss Stiffness]

$$S'' = \frac{K_C D_1}{Z_1} \frac{\sin(\varphi - \psi)}{(D_1/Z_1)^2 - 2(D_1/Z_1)\cos(\varphi - \psi) + 1}$$

[Eq. 7.3, Loss Tangent, or Tan Delta]

$$\tan\delta = S''/S' = \frac{\sin(\varphi - \psi)}{\cos(\varphi - \psi) - (D_1/Z_1)}$$

Numerical determination of viscoelastic material properties (storage and loss moduli) from dynamic stiffness (of the probe-sample contact) experimental data requires knowledge of the contact size: these parameters are determined from storage and loss stiffness, if the geometry of the contact (contact area, contact radius) is characterized:

[Eq. 8.1, Storage Modulus]

$$E' = \frac{S'}{2a_c} = \frac{K_c D_1}{2a_c Z_1} \frac{\cos(\varphi - \psi) - (D_1/Z_1)}{(D_1/Z_1)^2 - 2(D_1/Z_1)\cos(\varphi - \psi) + 1}$$

[Eq. 8.2, Loss Modulus]

$$E'' = \frac{S''}{2a_c} = \frac{K_c D_1}{2a_c Z_1} \frac{\sin(\varphi - \psi)}{(D_1/Z_1)^2 - 2(D_1/Z_1)\cos(\varphi - \psi) + 1}$$

[Eq. 8.3, Loss Tangent, or Tan Delta]

$$\tan\delta = E''/E' = S''/S' = \frac{\sin(\varphi - \psi)}{\cos(\varphi - \psi) - (D_1/Z_1)},$$

where $a_c$ is contact radius between the tip of the probe and the sample.

In practice, the size of the nanoscale contact cannot be readily visualized or measured directly, but can be determined from the analysis of indentation force-distance curve, for example, by applying Johnson-Kendall-Roberts (JKR) contact mechanics model to a retract portion of force-distance curve.

Accordingly, an embodiment of the AFM-nDMA methodology of the present invention utilizes the well-known Johnson-Kendall-Roberts (JKR) contact mechanics model for calculation of the contact size, in conjunction with the use of a probe having well-characterized spherical tip geometry. (Notably, while the JKR model is widely used and well accepted for analysis of mechanical properties of soft materials such as polymers, it is also well recognized that the JKR model was formulated for linearly elastic materials, and is not, strictly speaking, suitable for accurate description of viscoelastic materials. K J Wahl et al., *Journal of colloid and interface science*, 296 (1), 178-188, 2006, extended this analysis to viscoelastic materials for oscillating adhesive contact.) To alleviate a suspected discrepancy in JKR model results on a viscoelastic material (for example, in experiments with long hold periods of AFM-nDMA measurements at low frequencies), an embodiment of the present invention additionally provides a verification methodology that utilizes a specialized "Punch Probe" AFM tip with known size of the contact area and does not rely on any particular contact mechanics model for calculation of material properties from dynamic stiffness. Such feature is not known or used in AFM-related art.) Notably—and in reference to Eqs. 8.1, 8.2, and 8.3, the determination of storage and loss moduli requires inference of the contact radius from indentation contact mechanics analysis. In comparison, the determination of the loss tangent (tan delta) does not require knowing the contact radius, and is calculated directly from a ratio of deflection and displacement amplitude, and a difference in phase between deflection and displacement.

Reference Frequency Technique—Compensation for Creep of Contact Radius in AFM-Based Measurements.

As described above, the contact radius—which is required for calculation of viscoelastic storage and loss modulus values—is determined from a retract part of force-distance curve—after all hold segments with AFM-nDMA measurements at all predetermined frequencies are completed. This contact radius value, estimated at the very end of indentation Hold, would need to be applied in calculations across all frequency segments, which could have preceded the retract event by a potentially long time (possibly several minutes for sub-Hertz frequencies). If sample creep relaxation (under preload force) is achieved before frequency measurement segments (in other words, if the first relaxation-wait segment is sufficiently long), and if the DC force is maintained sufficiently constant during Hold (as in force setpoint modulation regime), and if there is substantially no creep of adhesion force, then the contact radius can remain practically constant for the whole duration of the AFM-nDMA measurement Hold.

In most other cases, however, there is some creep present in contact radius during Hold, and the straightforward adaptation of the retract curve contact radius value may lead to systematic errors in AFM-nDMA calculations. The related art does not address these problems.

To compensate for uncertainty due to a possible creep of contact area during Hold, an embodiment of the invention utilizes a special Reference Frequency approach discussed below. Re-arranging Equation 8.1, one obtains:

$$S' = 2a_c E' \qquad [\text{Eq. 9}]$$

A person of skill in the art will readily appreciate that assumption of substantial stability, continuity, invariability of material property, storage modulus E' at certain frequency $f_0$ under maintained experimental conditions (such temperature, humidity, etc.) is practically and operationally reasonable. Then, storage stiffness S', measured at a predetermined frequency $f_0$, is proportional to the contact radius, $a_c$. If the storage stiffness S' ($t_i$) is measured at the predetermined frequency $f_0$ (referred to herein as a "reference frequency") at different moments of time $t_i$ in $\{t_1, t_2, t_3\}$ during the indentation Hold, and is also measured as S'($t_r$) at the very end of hold, immediately before probe retract time $t_r$, then the contact radius values $a_c(t_i)$ can be reconstructed (or further, interpolated) during the whole time of AFM-nDMA measurement $$S'(ti)/S'(tr) = a_c(ti)/a_c(tr) \qquad [\text{Eq. 10}],$$

where contact radius $a_c(t_r)$ value is determined from the retract curve.

Notably, loss stiffness S" (Eq. 7.2) can, in principle, also be used in a similar way for contact radius creep compensation; however, using storage stiffness S' makes more practical sense from signal-to-noise ratio considerations.

To effectuate the operation of an embodiment of the invention, the judicious use of a processor controlled by application-specific instructions stored in a tangible memory element may be required. Those skilled in the art should readily appreciate that required algorithmical functions, operations, and decisions may be implemented as computer program instructions, software, hardware, firmware or combinations thereof. Those skilled in the art should also readily appreciate that instructions or programs defining the functions and elements of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including the recitations in the claims and features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s). In addition, the terminology used herein is with the purpose of describing particular embodiments only, and is not intended to limit the scope of the present invention.

The invention claimed is:

1. An apparatus configured to determine a mechanical property of a viscoelastic sample with an atomic-force-microscope (AFM) hardware, the apparatus comprising:
   an excitation electronic circuitry operably connected with the AFM and configured to generate an excitation force signal that includes a fundamental signal at a fundamental frequency and multiple harmonic signals at corresponding multiple harmonics of the fundamental frequency, wherein
      (a) said fundamental signal and said multiple harmonic signals have no pre-determined phase shifts with respect to one another such that the excitation force signal has a maximum excitation force value only at a beginning of a pre-determined time period and a minimum excitation force value only at an end of said pre-determinedtime period, or
      b) said fundamental signal and said multiple harmonic signals have pre-determined phase shifts with respect to one another such that the excitation force signal includes multiple amplitude peaks within said pre-determined time period;
   a feedback electronic circuitry configured to monitor both a mean value of said excitation force signal and an oscillatory component of said excitation force signal and to generate a feedback output representing both the mean value of said excitation force signal and the oscillatory component of said excitation force signal;
   an electro-mechanical sub-system cooperated with the excitation electronic circuitry and the feedback electronic circuitry and configured:
      when the cantilever is deflected by a pre-determined amount from a nominal orientation thereof, as determined by a position-detecting system of the apparatus, to cause a mechanical oscillation between the sample and the probe in response to the excitation force signal transferred from the excitation electronic circuitry; and
      upon receiving the feedback output, to maintain one of the sample and the probe in a position, with respect to the other of the sample and the probe, in which at least one of
         i) an average sample-loading force, generated by the probe, and
         ii) an area of contact between a tip of the probe and a surface of the sample
      is kept substantially constant during said mechanical oscillation; and
   a programmable processor in operable communication with at least the position-detecting system and programmed:
      to transfer the excitation force signal from the excitation electronic circuitry to the electro-mechanical sub-system, and
      to suspend an operation of the electro-mechanical sub-system for a relaxation period of time sufficient for relaxation of a creep of the surface of the sample that is caused by repositioning of said one of the sample and the probe with respect to the other of the sample and the probe.

2. An apparatus according to claim 1, wherein the position-detecting system is configured to detect a deflection of a cantilever of a cantilevers probe of the AFM and to generate data representing the deflection; and
   wherein the programmable processor is configured to acquire said data from the position-detecting system to determine a viscoelastic parameter after the relaxation period of time has lapsed.

3. An apparatus according to claim 2, further comprising a recording device in operable communication with the programmable processor and configured to produce an output that is perceivable by a user and that represents said viscoelastic parameter.

4. An apparatus according to claim 1, wherein said excitation electronic circuitry is configured to generate the excitation force signal including multiple sinusoidal signals that have respectively-corresponding distinct frequencies covering at least one decade in a frequency space, wherein amplitudes of said multiple sinusoidal signals are varied between a pre-defined maximum value and a pre-defined minimum value each of which the same for all of said multiple sinusoidal signals.

5. An apparatus according to claim 4, configured to determine said viscoelastic parameter at said distinct frequencies that cover at least one decade in the frequency space in absence of using either a lock-in detection or a Fast-Fourier Transform based analysis.

6. An apparatus according to claim 1, wherein said electro-mechanical sub-system is further configured to reposition one of the sample and the cantilevered probe until a cantilever of the cantilevered probe is deflected by a pre-determined amount from a nominal orientation of the cantilever.

7. An apparatus according to claim 1, wherein said feedback electronic circuitry is configured to compensate for the creep of the surface of the sample.

8. An apparatus according to claim 1, wherein the programmable processor is configured to control the excitation electronic circuitry to adjust one or more of maximum and minimum values of an amplitude and a phase of the oscillatory component of the excitation force signal thereby modulating a sample-loading force generated by the probe.

9. A method for determining a mechanical property of a viscoelastic sample with an atomic-force-microscope (AFM) hardware, the method comprising:
   with the use of the apparatus according to claim 1:
      monitoring, with electronic circuitry of the apparatus, an operation of the apparatus at a reference frequency to correct for a change in at least one of (i) an area of contact between a tip of a cantilevered probe of the AFM hardware of the apparatus and a surface of the viscoelastic sample and (ii) an average sample-loading force, generated by said cantilevered probe and measuring, at a set of frequencies that cover at least one decade in a frequency space, a viscoelastic parameter of a surface of the viscoelastic sample.

10. A method according to claim 9, wherein said measuring includes measuring, at a set of frequencies that are necessarily within a range from 0.001 Hz to 1,000 Hz, the viscoelastic parameter of the surface of said viscoelastic sample in absence of using either a lock-in detection or a Fast-Fourier-Transform based analysis.

11. A method according to claim 9, wherein said measuring includes measuring the viscoelastic parameter of the surface of the viscoelastic sample while compensating for at least one of a creep of the surface and a spatial drift of the apparatus.

12. A method according to claim 9, further comprising modulating a sample-loading force imposed by the cantilevered probe on the viscoelastic sample by generating, with an excitation electronic circuitry of the apparatus, an excitation force signal that includes multiple sinusoidal signals having respectively-corresponding distinct frequencies that cover said at least one decade in the frequency space, wherein amplitudes of said multiple sinusoidal signals are varied between a pre-determined maximum value and a pre-determined minimum value each of which remains the same for all of said multiple sinusoidal signals.

13. A method according to claim 12, wherein said generating multiple sinusoidal signals includes generating a fundamental signal at a fundamental frequency and multiple harmonic signals at different harmonics of said fundamental frequency to produce an excitation force signal to deflect the cantilever of the cantilevered probe under such conditions that (14a) said excitation force signal has a maximum value only at a beginning of a pre-determined time period and a minimum value only at an end of said pre-determined time period, or (14b) said excitation force signal having multiple amplitude peaks within said pre-determined time period.

14. A method according to claim 9, further comprising:
while maintaining the area of contact to remain substantially constant, repositioning the cantilevered probe towards the surface of the viscoelastic sample until the cantilever of the cantilevered probe is deflected by a pre-determined amount from a nominal orientation of the cantilever as determined by a position-detecting system of the apparatus.

15. A method according to claim 14, wherein said maintaining the area of contact to remain substantially constant includes compensating for the change in the area of contact based on determining a change in dynamic stiffness of contact between the tip of the cantilevered probe and the surface of the viscoelastic sample.

16. A method according to claim 9,
further comprising suspending an operation of an electromechanical sub-system of the apparatus for a relaxation period of time sufficient for relaxation of the creep of the surface of the viscoelastic sample that is caused by repositioning of one of the viscoelastic sample and the cantilevered probe with respect to the other of the viscoelastic sample and the cantilevered probe; and
wherein said measuring includes acquiring data from the position-detecting system of the apparatus, configured to detect a deflection of a cantilever of the cantilevered probe, to determine said viscoelastic parameter after the relaxation period of time has lapsed.

17. A method according to claim 9, further comprising:
during a first period of time acquiring, from a sensor of the electronic circuitry of the apparatus, a first set of electrical signals at a frequency from said set of frequencies to determine a depth of deformation of the surface with the tip of the probe, and
during a second period of time acquiring, from the sensor of the electronic circuitry of the apparatus, a second set of electrical signals at a reference frequency to compensate for the change in the area of contact caused by the creep of the surface of the viscoelastic sample,
wherein the sensor includes at least one of a deflection sensor and a sensor configured to measure a position of the cantilevered probe with respect to the surface of the viscoelastic sample.

18. A method according to claim 17, wherein said acquiring the first set of electrical signals and said acquiring the second set of electrical signals are processes alternating with one another.

19. A method according to claim 17, wherein the reference frequency is not included in said set of frequencies.

20. A method according to claim 9, further comprising modulating a sample-loading force imposed by the cantilevered probe on the viscoelastic sample by generating, with the excitation electronic circuitry of the apparatus, an excitation force signal that includes multiple sinusoidal signals having respectively-corresponding distinct frequencies that cover said at least one decades in the frequency space, wherein a corresponding amplitude of each of said multiple sinusoidal signals is varied between a maximum value and a minimum value, each of the maximum value and the minimum value remaining the same for all of said multiple sinusoidal signals.

* * * * *